(12) United States Patent
Hayashi

(10) Patent No.: US 10,348,926 B2
(45) Date of Patent: Jul. 9, 2019

(54) INFORMATION PROCESSING SYSTEM, INFORMATION PROCESSING APPARATUS, AND INFORMATION PROCESSING METHOD

(71) Applicant: Yuuichiroh Hayashi, Kanagawa (JP)

(72) Inventor: Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 61 days.

(21) Appl. No.: 15/407,585

(22) Filed: Jan. 17, 2017

(65) Prior Publication Data

US 2017/0208203 A1 Jul. 20, 2017

(30) Foreign Application Priority Data

Jan. 20, 2016 (JP) .................................. 2016-008756
Nov. 7, 2016 (JP) .................................. 2016-217099

(51) Int. Cl.
  *H04N 1/00* (2006.01)
  *H04N 1/21* (2006.01)
  (Continued)

(52) U.S. Cl.
  CPC ........... *H04N 1/2166* (2013.01); *G06F 3/129* (2013.01); *G06F 3/1224* (2013.01); *G06F 3/1277* (2013.01); *H04N 1/00244* (2013.01); *H04N 1/0417* (2013.01); *H04N 2201/0094* (2013.01)

(58) Field of Classification Search
  CPC ...... G06F 21/121; G06F 21/44; G06F 21/608; G06F 3/1219; G06F 3/1229;
  (Continued)

(56) References Cited

U.S. PATENT DOCUMENTS 8,307,304 B2 11/2012 Takahashi
10,120,758 B2 * 11/2018 Hayashi .............. G06F 11/1402
(Continued)

FOREIGN PATENT DOCUMENTS

JP 2003-157242 5/2003
JP 4039191 1/2008
(Continued)

*Primary Examiner* — Chad Dickerson
(74) *Attorney, Agent, or Firm* — IPUSA, PLLC

(57) ABSTRACT

An information processing system includes a storage storing a first program for providing a function and a second program for executing a process for implementing the function; a storage storing, for each application for executing a sequence of processes, identification information identifying the application and information relating to the sequence of processes, the sequence-related information defining the second program for executing the process included in the sequence of processes; a unit for accepting a request from a device coupled to the system, the request including the identification information and electronic data-related information; and a process executer configured to execute the sequence of processes using electronic data based on the information included in the request, as the first program, which corresponds to the second program defined in the sequence-related information associated with the identification information included in the request, requests the second program to execute the predetermined process.

11 Claims, 16 Drawing Sheets

(51) Int. Cl.
*G06F 3/12* (2006.01)
*H04N 1/04* (2006.01)

(58) Field of Classification Search
CPC ... G06F 3/1288; G06F 9/30003; H04L 67/10; H04L 67/16; H04L 67/1097; H04L 67/36; B30B 15/0094; B30B 15/26; B30B 1/186; H04N 1/2166; H04N 1/00244; H04N 1/0417; H04N 2201/0094
USPC ....... 358/1.11–1.18, 400–404; 709/201–203, 709/210–213
See application file for complete search history.

(56) References Cited

U.S. PATENT DOCUMENTS

| | | | |
|---|---|---|---|
| 10,122,870 B2* | 11/2018 | Sugimura | H04N 1/00962 |
| 2004/0057076 A1 | 3/2004 | Hirose et al. | |
| 2014/0223004 A1* | 8/2014 | Honda | H04L 67/1097 |
| | | | 709/224 |
| 2014/0223150 A1* | 8/2014 | Honda | G06F 11/3664 |
| | | | 712/227 |
| 2014/0223536 A1* | 8/2014 | Matsushima | H04L 67/10 |
| | | | 726/11 |
| 2015/0029536 A1* | 1/2015 | Suzuki | G06F 21/608 |
| | | | 358/1.14 |
| 2015/0350344 A1* | 12/2015 | Sugimura | H04L 67/16 |
| | | | 709/202 |
| 2016/0241724 A1 | 8/2016 | Sugimura et al. | |

FOREIGN PATENT DOCUMENTS

| | | |
|---|---|---|
| JP | 2009-238207 | 10/2009 |
| JP | 2015-055951 | 3/2015 |
| JP | 2016-154000 | 8/2016 |

* cited by examiner

FIG.5A

| COMMON I/F | SUMMARY |
|---|---|
| /EXTERNAL SERVICE NAME/process/file | ACQUIRE FILE FROM SPECIFIED STORAGE SERVICE |
| /EXTERNAL SERVICE NAME/process/folder | STORE FILE IN SPECIFIED STORAGE SERVICE |
| ... | ... |

FIG.5B

| UNIQUE I/F | SUMMARY |
|---|---|
| /EXTERNAL SERVICE NAME/process/extension/attach | ADD FILE TO DOCUMENT STORED IN SPECIFIED STORAGE SERVICE |
| ... | ... |

FIG.5C

| COMMON I/F | SUMMARY |
|---|---|
| /EXTERNAL SERVICE NAME/data/files | ACQUIRE FILE LIST FROM SPECIFIED STORAGE SERVICE |
| /EXTERNAL SERVICE NAME/data/folders | ACQUIRE FOLDER LIST FROM SPECIFIED STORAGE SERVICE |
| ... | ... |

FIG.5D

| UNIQUE I/F | SUMMARY |
|---|---|
| /EXTERNAL SERVICE NAME/data/extension/images | ACQUIRE IMAGE FILE LIST FROM SPECIFIED STORAGE SERVICE |
| ... | ... |

FIG.7

| DATA FORMAT BEFORE CONVERSION | DATA FORMAT AFTER CONVERSION | FORMAT CONVERSION TO BE GENERATED |
|---|---|---|
| InputStream | LocalFilePath | FIRST FORMAT CONVERSION |
| LocalFilePath | File | SECOND FORMAT CONVERSION |
| ... | ... | ... |

```
flowid:"flow001"  }1101
From("file:input")  }1102
.to("conversion:pdf")
.to("send_to_storage:storageA? targetfolder=folder1& filename=sample")  }1103
```

```
<html>
  <head>
    ...
  </head>
  <body>
    <h1>Scan Sample</h1>

<p><label>FILE NAME</label>                                        ⎫
    <input id="filename" type="text" name="filename"/></p>             ⎬ 2001
    <p><label>SELECT STORAGE DESTINATION FOLDER</label>                ⎫
    <select id="targetfolder" name="targetfolder">                     ⎬ 2002
      <option value=""></option>                                       ⎭
    </select></p>
    <p><button onclick="scan_function()">Scan</button></p>   ⎬ 2003

</body>
</html>
```

2000

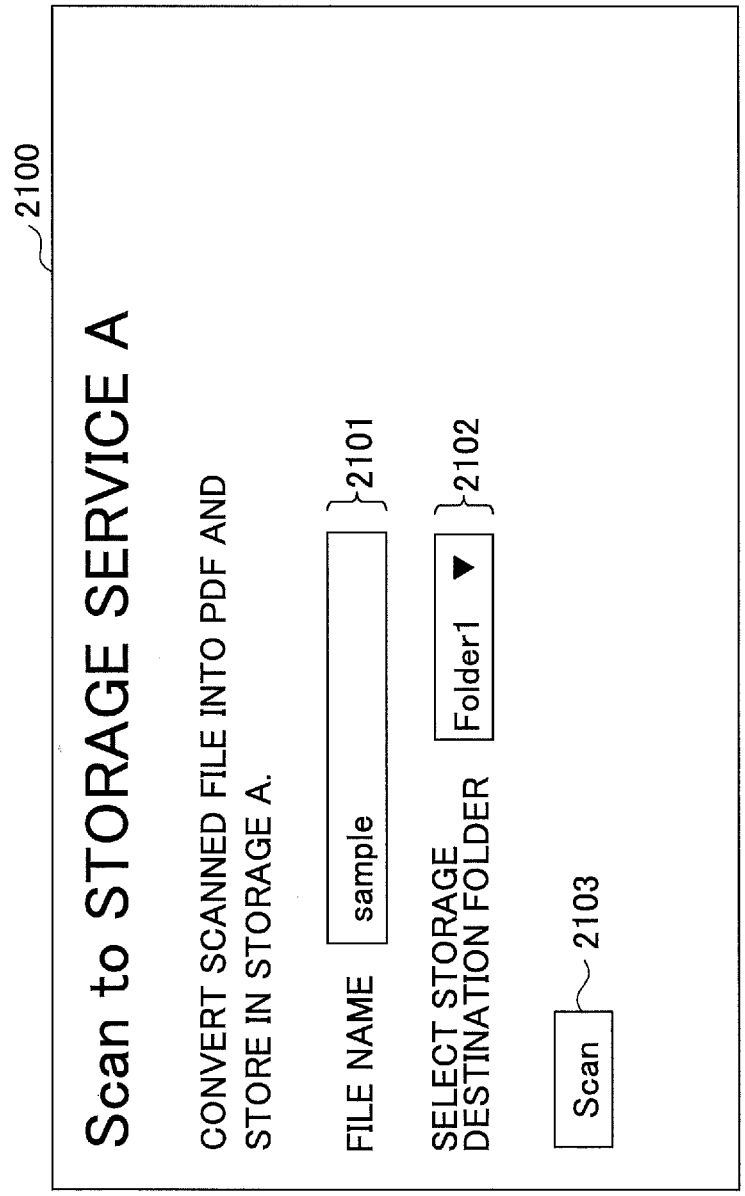

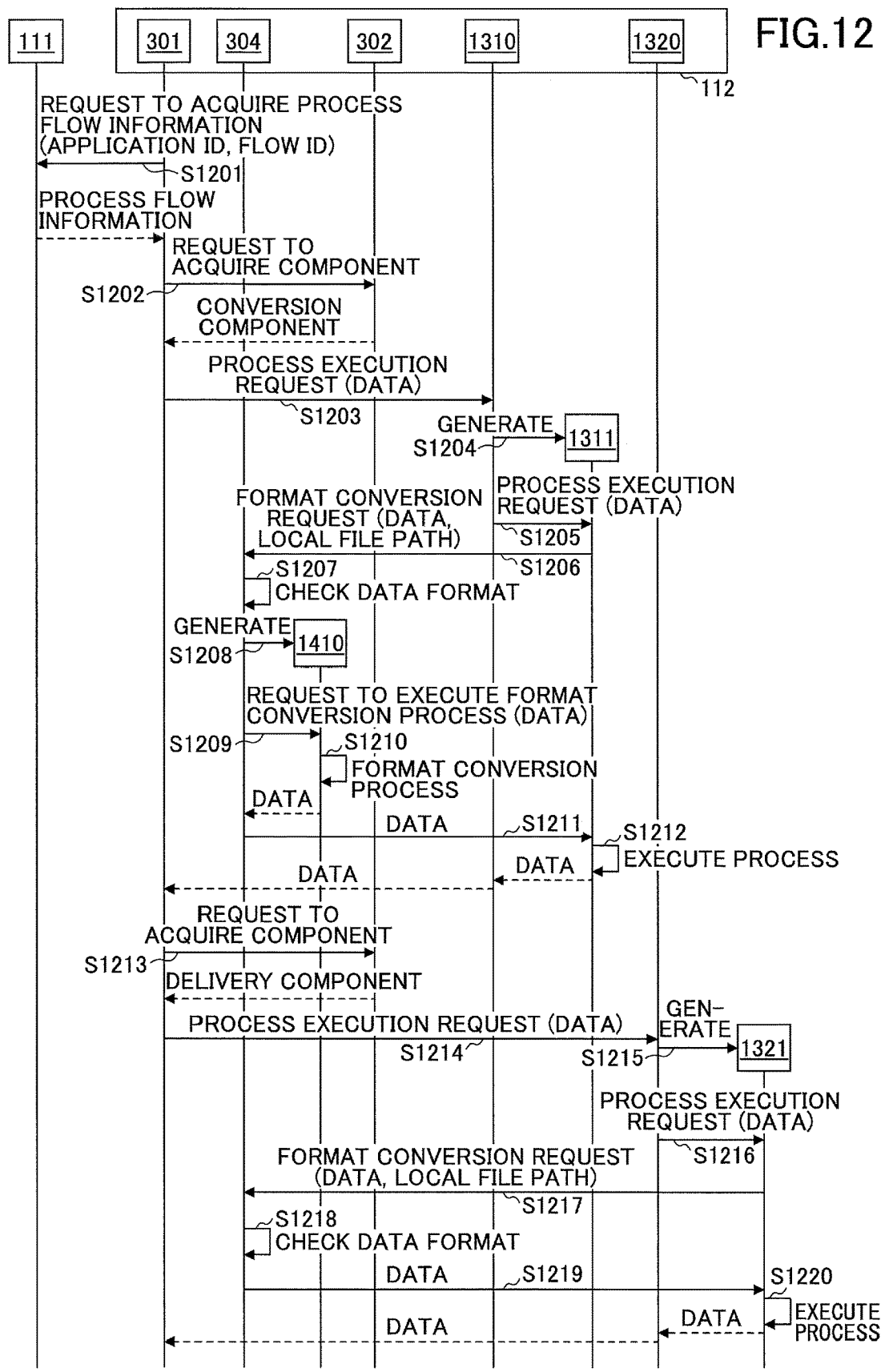

INFORMATION PROCESSING SYSTEM, INFORMATION PROCESSING APPARATUS, AND INFORMATION PROCESSING METHOD

CROSS-REFERENCE TO RELATED APPLICATION

The present application claims the benefit of priority under 35 U.S.C. § 119 of Japanese Patent Application No. 2016-008756, filed on Jan. 20, 2016 and Japanese Patent Application No. 2016-217099, filed on Nov. 7, 2016, the contents of which are incorporated herein by reference in their entirety.

BACKGROUND OF THE INVENTION

1. Field of the Invention

The present invention relates to an information processing system, an information processing apparatus, and an information processing method.

2. Description of the Related Art

In recent years, a service of providing a function in which a plurality of functions (for example, scanning printing, and uploading to an external service, etc.) are combined, has become known. For example, there is known a service of uploading electronic data, which has been generated by scanning, to an external service, etc. Such a service is realized as one or more processes realizing functions are executed as a sequence of processes.

Furthermore, there is known an image forming apparatus for executing a sequence of processes based on an instruction including process information, etc., expressing one or more processes as a sequence of processes (see, for example, patent document 1).

Patent Document 1: Japanese Patent No. 4039191

SUMMARY OF THE INVENTION

An aspect of the present invention provides an information processing system, an information processing apparatus, and an information processing method, in which one or more of the above-described disadvantages are reduced.

According to one aspect of the present invention, there is provided an information processing system for executing a sequence of processes using electronic data, the information processing system including one or more information processing apparatuses for implementing various functions of the information processing system, the information processing system including a program storage configured to store, for each predetermined function, a program group including at least one first program for providing the predetermined function and one or more second programs for executing a predetermined process for implementing the predetermined function in response to a process execution request from the at least one first program; an application information storage configured to store, for each application for executing the sequence of processes, identification information for identifying the application and sequence-related information relating to the sequence of processes in association with each other, the sequence-related information defining the one or more second programs for executing each of the predetermined processes included in the sequence of processes; an accepter configured to accept a request from a device among one or more devices coupled to the information processing system, the request including the identification information and electronic data-related information relating to the electronic data to be used for executing the sequence of processes; and a process executer configured to execute the sequence of processes using the electronic data based on the electronic data-related information included in the request accepted by the accepter, the sequence of processes being executed as each of the first programs, which corresponds to one of the one or more second programs defined in the sequence-related information stored in the application information storage in association with the identification information included in the request, makes the process execution request to the corresponding one of the one or more second programs to execute the predetermined process.

BRIEF DESCRIPTION OF THE DRAWINGS

Other objects, features and advantages of the present invention will become more apparent from the following detailed description when read in conjunction with the accompanying drawings, in which:

FIGS. 5A through 5D illustrate examples of a common I/F and a unique I/F;

FIG. 7 illustrates an example of a format conversion information table according to an embodiment of the present invention;

FIG. 8 illustrates an example of process flow information according to an embodiment of the present invention;

FIG. 10 illustrates an example of screen information according to an embodiment of the present invention;

FIG. 11 illustrates an example of an application screen according to an embodiment of the present invention;

FIG. 12 is a sequence diagram of an example of a process of executing a process flow according to the first embodiment of the present invention;

DETAILED DESCRIPTION OF THE PREFERRED EMBODIMENTS

In the conventional technology, there are cases where it is necessary to develop an application to be installed in the image forming apparatus in order to perform the sequence of processes. In these cases, it may be necessary to add and correct, etc., the application installed in the image forming apparatus, when a function is added and deleted, etc.

Therefore, there have been cases where the labor hours, which are required for developing the application to be installed in the image forming apparatus, increase.

A problem to be solved by an embodiment of the present invention is to support the development of an application for performing a sequence of processes.

Embodiments of the present invention will be described by referring to the accompanying drawings.

First Embodiment

<System Configuration>

Figure 1:
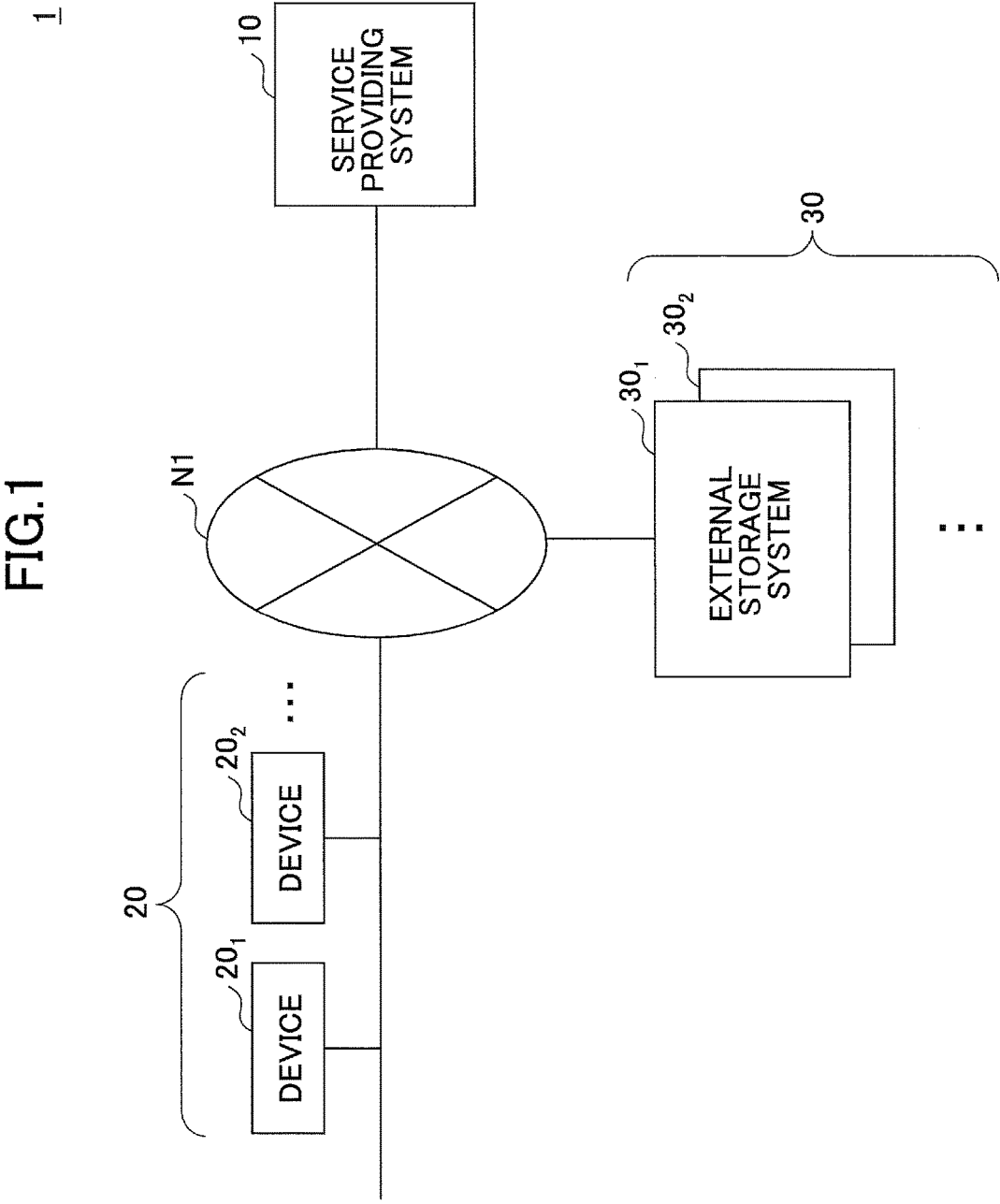
FIG. 1 is a diagram illustrating an exemplary system configuration of an information processing system according to a first embodiment of the present invention.

Referring to FIG. 1, an information processing system 1 according to the first embodiment is described. FIG. 1 is a diagram illustrating an exemplary system configuration of the information processing system 1 according to the first embodiment.

The information processing system 1 illustrated in FIG. 1 includes a service providing system 10, a device 20, and an external storage system 30, which are communicably coupled through a wide area network N1 such as the Internet.

The service providing system 10 is implemented by at least one information processing apparatus and provides various services realized by a sequence of processes, which cooperate with an external service such as cloud service via the network N1.

The service provided by the service providing system 10 according to the first embodiment is specifically described below. Hereinafter, the sequence of processes is referred to as a "process flow".

Although the external service to be described in the first embodiment is specifically the cloud service, the external service is not limited to this cloud service. For example, the first embodiment may be applied to various external services such as a service provided by an application service provider (ASP) and a web service, which are provided via the network.

The devices 20 are various electronic devices used by a user. That is, the device 20 is, for example, an image forming apparatus such as a multifunction peripheral (MFP), a personal computer (PC), a projector, an electronic whiteboard, a digital camera, or the like. The user uses the device 20 to use various services provided by the service providing system 10.

Hereinafter, when each of the plurality of devices 20 is distinguished, a suffix is added such as a "device $20_1$" and a "device $20_2$".

The external storage system 30 is a computer system providing a cloud service called a storage service or an online storage. The storage service is a service of lending a memory area of a storage of the external storage system 30.

Hereinafter, when each of the plurality of external storage systems 30 is distinguished, a suffix is added such as an "external storage system $30_1$" and an "external storage system $30_2$". Further, the name of the storage service provided by the external storage system $30_1$ is a "storage A", and the name of the storage service provided by the external storage system $30_2$ is a "storage B".

The external storage system 30 may be a system implemented by a plurality of information processing apparatuses.

The configuration of the information processing system 1 illustrated in FIG. 1 is an example and may have other configurations. For example, the information processing system 1 according to the first embodiment includes various devices, each of which performs at least one of an input and an output of the electronic data. These devices may use various services provided by the service providing system 10.

<Hardware Configuration>

Figure 2:
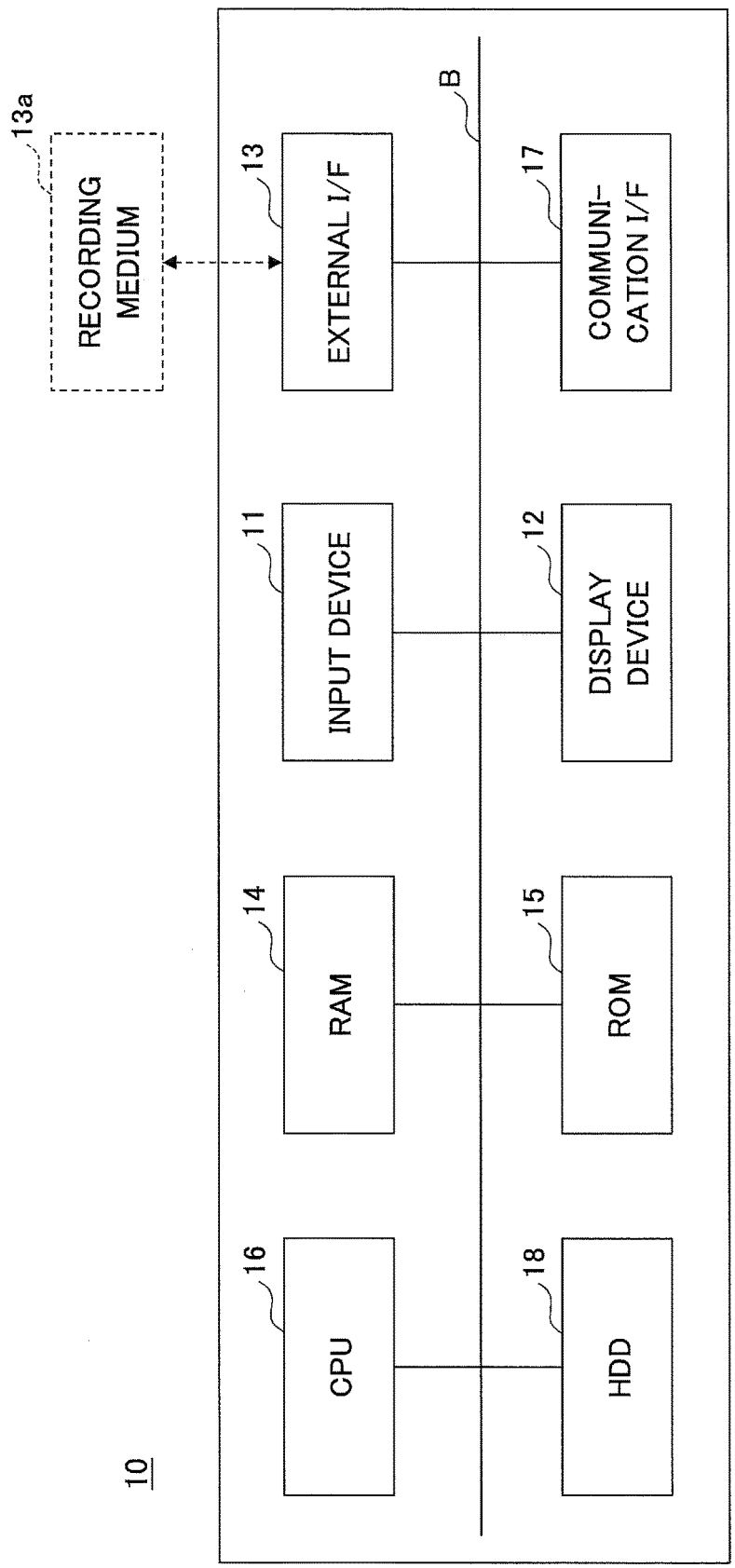
FIG. 2 is a diagram illustrating a hardware configuration of an exemplary service providing system according to the first embodiment of the present invention.

Referring to FIG. 2, described next is the hardware configuration of the service providing system 10 included in the information processing system 1 according to the first embodiment. FIG. 2 is a diagram illustrating the hardware configuration of an exemplary service providing system 10 according to the first embodiment.

The service providing system 10 illustrated in FIG. 2 includes an input device 11, a display device 12, an external interface (I/F) 13, and a random access memory (RAM) 14. Further, the service providing system 10 includes a read only memory (ROM) 15, a central processing unit (CPU) 16, a communication interface (I/F) 17, and a hard disk drive (HDD) 18. Each of the ROM 15, the CPU 16, a communication I/F 17, and the HDD 18 is connected by the bus B.

The input device 11 includes a keyboard, a mouse, a touch panel, and the like, by which the user inputs various operation signals. The display device 12 includes a display or the like to display a process result acquired by the service providing system 10. At least one of the input device 11 and the display device 12 may be in a mode of being connected to the service providing system 10 so as to be used.

The communication I/F 17 is an interface provided to couple the service providing system 10 with the network N1. Thus, the service providing system 10 can communicate with another device through the communication I/F 17.

The HDD 18 is a non-volatile memory device that stores programs and data. The program and data stored in the HDD 18 are an operating system (OS), which is basic software controlling the entire service providing system 10, application software providing various functions in the OS, and so on.

The service providing system 10 may use a drive device (e.g., a solid state drive (SSD)) using a flash memory as a memory medium in place of the HDD 18. Further, the HDD 18 administers the stored program and the stored data using at least one of a predetermined file system and a predetermined database (DB).

The external I/F 13 is an interface with an external device. The external device includes a recording medium 13a and so on. With this, the service providing system 10 can read information from the recording medium 13a and write information to the recording medium 13a through the external I/F 13. The recording medium 13a is a flexible disk, a CD, a DVD, an SD memory card, a USB memory, or the like.

The ROM 15 is a non-volatile semiconductor memory that can store a program or data even when a power source is powered off. The ROM 15 stores a program and data such as a basic input/output system (BIOS), an operating system (OS) setup, a network setup, or the like, which are executed at a time of starting up the service providing system 10. The RAM 14 is a volatile semiconductor memory configured to temporarily store the program and the data.

The CPU 16 reads the program and/or data from the memory device such as the ROM 15 and the HDD 18. The read program or the read data undergo a process to thereby realize a control or a function of the entire service providing system 10.

The service providing system 10 of this embodiment can realize various processes described below by having the above hardware configuration of the service providing system 10 illustrated in FIG. 2.

Figure 3:
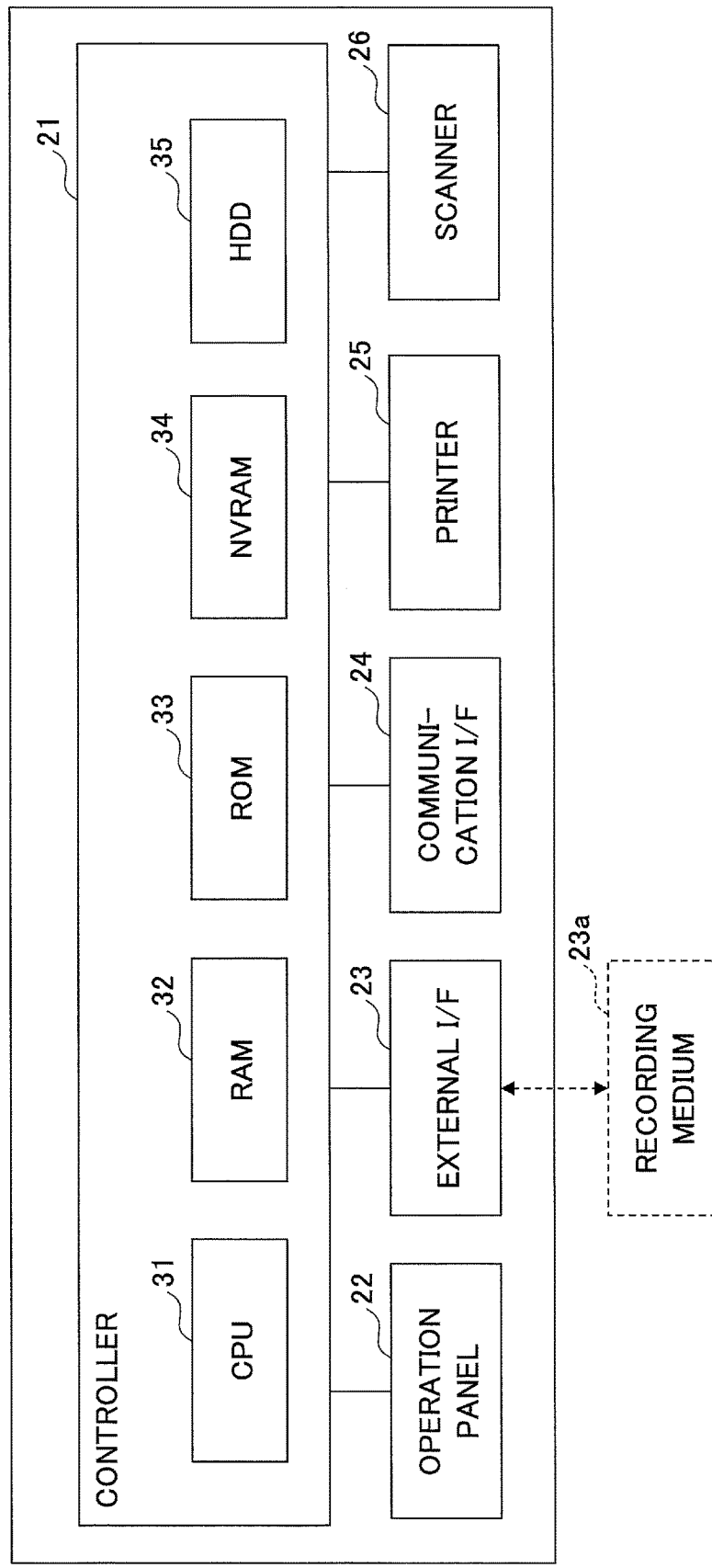
FIG. 3 is a diagram illustrating a hardware configuration of an exemplary device according to the first embodiment of the present invention.

Referring to FIG. 3, described next is the hardware configuration of an image forming apparatus, which is the device 20 included in the information processing system 1 of the embodiment. FIG. 3 is a diagram illustrating a hardware configuration of an exemplary device 20 according to the first embodiment.

The device 20 illustrated in FIG. 3 includes a controller 21, an operation panel 22, an external interface (I/F) 23, a communication I/F 24, a printer 25, and a scanner 26. The controller 21 includes a central processing unit (CPU) 31, a random access memory (RAM) 32, a read only memory (ROM) 33, a non-volatile random access memory (NVRAM) 34, and a hard disk drive (HDD) 35.

The ROM 33 is a non-volatile semiconductor memory that stores various programs and data. The RAM 32 is a volatile semiconductor memory configured to temporarily store the program and the data. For example, setup information or the like is stored in the NVRAM 34. The HDD 35 is a non-volatile memory device that stores the various programs and data.

The CPU 31 reads the program, the data, setup information, or the like into the RAM 32 from the ROM 33, the NVRAM 34, the HDD 35, or the like, and executes the process. Thus, the CPU 31 is an arithmetic device realizing a control and a function of the entire device 20.

The operation panel 22 includes an input unit configured to receive an input from the user and a display unit configured to display. The external I/F 23 is an interface with the external device. The external device includes a recording medium 23a and so on. With this, the device 20 can perform at least one of reading information from the recording medium 23a through the external I/F 23 and writing the information to the recording medium 23a through the external I/F 23. The recording medium 23a is, for example, an IC card, a flexible disk, a compact disc (CD), a digital versatile disc (DVD), a secure digital (SD) memory card, and a universal serial bus (USB) memory.

The communication I/F 24 is an interface coupling the device 20 with the network. Thus, the device 20 can perform data communications through the communication I/F 24. The printer 25 is provided to print data. The scanner 26 is a reading device that reads an original and generates an electronic file (an image file).

The device 20 according to the first embodiment includes a hardware configuration illustrated in FIG. 3 to realize various processes described below.

<Service Provided by Service Providing System>

The service provided by the service providing system 10 according to the first embodiment is described. Hereinafter, a description is given of a case where the device 20 is an image forming apparatus.

The service providing system 10 according to the first embodiment provides a service of converting the data format of an electronic file, which has been generated, for example, by scanning an original document at the device 20, into a Portable Document Format (PDF), and storing the electronic file in the external storage system 30.

The service providing system 10 according to the present embodiment is described as providing a service of converting an electronic file generated by a scanning operation into a PDF format as described above and delivering the electronic file to the external storage system 30 (scan delivery). In the following, this kind of service is also expressed as a "scan delivery service". Note that in the present embodiment, a description is given of a case where the data format of an electronic file, which is generated by scanning an original document at the device 20, is converted into a PDF format; however, the present embodiment is not, so limited, and the data format of the electronic file may be converted into any data format.

However, the service provided by the service providing system 10 is not limited to the above. For example, the service providing system 10 may provide a service of printing an electronic file stored in the external storage system 30 by the device 20 (cloud print service). Furthermore, the service providing system 10 may provide a service of performing an Optical Character Reading (OCR) process on an electronic file generated by scanning an original document at the device 20, and storing the electronic file in the external storage system 30.

<Functional Configuration>

Figure 4:
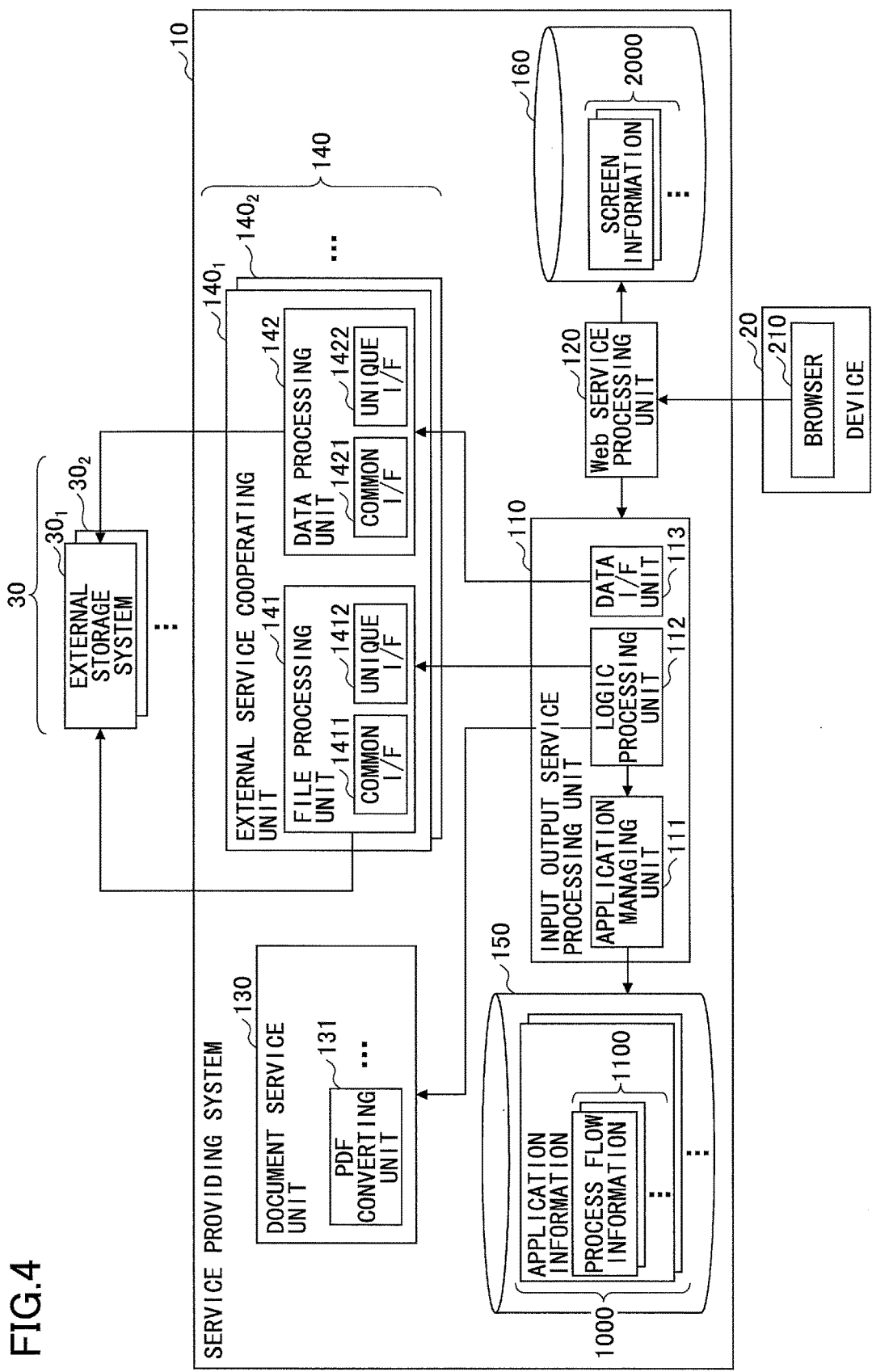
FIG. 4 illustrates a functional configuration of an example of the information processing system according to the first embodiment of the present invention.

Next, a description is given of a functional configuration of the information processing system 1 according to the present embodiment, by referring to FIG. 4. FIG. 4 illustrates a functional configuration of an example of the information processing system 1 according to the first embodiment.

The device 20 according to the present embodiment includes a browser 210 executed by, for example, the CPU 31, etc. The user of the device 20 is able to use a service provided by the service providing system 10, via the browser 210. In this way, the device 20 according to the present embodiment can function by having the browser 210 installed.

The service providing system 10 according to the present embodiment includes an input output service processing unit 110, a web service processing unit 120, a document service unit 130, and an external service cooperating unit 140. These units are realized by a process that the CPU 16 is caused to execute by one or more programs installed in the service providing system 10.

Furthermore, the service providing system 10 according to the present embodiment includes an application information storage unit 150 and a screen information storage unit 160. These storage units can be realized by the HDD 18. Note that at least one of the application information storage unit 150 and the screen information storage unit 160 may be realized by a storage device, etc., that is connected to the service providing system 10 via a network.

The input output service processing unit 110 performs a process relevant to a service provided by the service providing system 10. Here, the input output service processing unit 110 includes an application managing unit 111, a logic processing unit 112, and a data I/F unit 113.

The application managing unit 111 manages application information 1000 stored in the application information storage unit 150. Note that the application information 1000 is an application for providing various services by the service providing system 10. That is, the various services provided by the service providing system 10 are provided according to the application information 1000.

Furthermore, the application managing unit 111 returns process flow information 1100 included in the application information 1000, in response to a request from the logic processing unit 112. Note that the process flow information 1100 defines a sequence of processes (process flow) for realizing a service provided by the application information 1000.

The logic processing unit 112 acquires the process flow information 1100 from the application managing unit 111, in response to a request from the web service processing unit 120. Then, the logic processing unit 112 executes a sequence of processes (process flow) for realizing a service, based on the acquired process flow information 1100. Accordingly, in the information processing system 1 according to the present embodiment, various services are provided by the service providing system 10. Note that details of the logic processing unit 112 are described below.

The data I/F unit 113 makes various requests to a data processing unit 142 of the external service cooperating unit 140, in response to a request from the web service processing unit 120. For example, the data I/F unit 113 makes a request to acquire a list of folders, to the data processing unit 142 of the external service cooperating unit 140.

The web service processing unit 120 returns screen information 2000 stored in the screen information storage unit 160, in response to a request from the browser 210. Note that the screen information 2000 is information for displaying a screen (application screen) for using a service provided by the application information 1000, and is defined in a format of, for example, HyperText Markup Language (HTML).

Accordingly, on the operation panel 22 of the device 20, an application screen for using a service provided by the service providing system 10, is displayed by the browser 210.

Furthermore, the web service processing unit 120 makes various requests to the input output service processing unit 110, in response to a request from the browser 210. For example, the web service processing unit 120 makes a request to execute a process of a scan delivery service to the logic processing unit 112 of the input output service processing unit 110, in response to a request from the browser 210.

The document service unit 130 is a group of programs (modules) for executing processes included in a sequence of processes (process flow) based on the process flow information 1100. The document service unit 130 includes a PDF converting unit 131 for converting the data format of an electronic file into a PDF format.

Note that the document service unit 130 may include other programs, such as a print converting unit for converting the electronic file into a data format (print data) that can be printed by the device 20, and a compression/decompression processing unit for compressing or decompressing the electronic file.

The external service cooperating unit 140 makes various requests to the external storage system 30, in response to a request from the logic processing unit 112 and the data I/F unit 113.

The service providing system 10 according to the present embodiment includes the external service cooperating unit 140 corresponding to each external storage system 30. That is, the service providing system 10 includes the external service cooperating unit 140$_1$ for making various requests to the external storage system 30$_1$, and the external service cooperating unit 140$_2$ for making various requests to the external storage system 30$_2$, etc.

As described above, the service providing system 10 according to the present embodiment includes the external service cooperating unit 140 corresponding to each external storage system 30 for performing a process in cooperation with the service providing system 10. Note that in the following, when each of the plurality of external service cooperating units 140 is distinguished, a suffix is added such as the "external service cooperating unit 140$_1$" and the "external service cooperating unit 140$_2$".

Here, the external service cooperating unit 140 includes a file processing unit 141 for receiving a request from the logic processing unit 112 and the data processing unit 142 for receiving a request from the data I/F unit 113.

The file processing unit 141 includes a common I/F 1411 and a unique I/F 1412, in which an application programming interface (API) for conducting a file operation (e.g., an acquisition operation, a storage operation, and an edit operation) to the electronic file stored in the external storage system 30, is defined.

The common I/F 1411 is an API commonly used among the plurality of external storage systems 30 as, for example, the API illustrated in FIG. 5A. That is, the common I/F 1411 of the file processing unit 141 is a group of APIs for using a function (e.g., a file acquisition function, and a file storage function) related to the file operation which can be used by all of the external storage systems 30.

The unique I/F 1412 is an API used by a specific external storage system 30 as, for example, the API illustrated in FIG. 5B. That is, the unique I/F 1412 of the file processing unit 141 is an API group of APIs for using a function (e.g., an editing function of an electronic file) related to the file operation that can be used in the specific external storage system 30.

Therefore, the common I/F 1411 is similarly defined for all the external service cooperating units 140. On the other hand, the unique I/F 1412 is defined for the external service cooperating unit 140 corresponding to the specific external storage system 30, in which the API defined by the unique I/F 1412 can be used.

On the other hand, the data processing unit 142 includes a common I/F 1421 and a unique I/F 1422, in which an API for acquiring meta data (e.g., a file list and a folder list) of bibliographic information of the electronic file stored in the external storage system 30 is defined.

The common I/F 1421 is an API commonly used among the plurality of external storage systems 30 as, for example, the API illustrated in FIG. 5C. That is, the common I/F 1421 of the data processing unit 142 is an API group of APIs for using a function (e.g., a function of acquiring a list of files and a list of folders) related to meta data acquisition that can be used by all the external storage systems 30.

The unique I/F 1422 is an API, which can be used by the specific external storage system 30, such as the API illustrated in FIG. 5D. That is, the unique I/F 1422 of the data processing unit 142 is an API group of APIs for using a function (e.g., a function of acquiring a list of image files), which is related to acquisition of metadata that can be used by the specific external storage system 30.

Therefore, the common I/F 1421 is similarly defined for all the external service cooperating units 140. On the other hand, the unique I/F 1422 is defined for the external service cooperating unit 140 corresponding to the specific external storage system 30, in which the API defined by the unique I/F 1422 can be used.

As described above, the service providing system 10 according to the present embodiment includes the external service cooperating units 140 respectively corresponding to the external storage systems 30, which respectively perform processes in cooperation with the service providing system 10. Therefore, in a case where the external storage system 30 to be the cooperation destination of the service providing system 10 is added or deleted (hereinafter, referred to as an "addition, etc."), the external service cooperating unit 140 corresponding to the external storage system 30 is to be added, etc., to the service providing system 10.

Therefore, in the service providing system 10 according to the first embodiment, the influence caused by the addition, etc., of the external storage system 30, which is to be the cooperation destination, can be localized. That is, in the service providing system 10 according to the present embodiment, the addition, etc., of the external storage system 30, which is to be the cooperation destination, can be done without influencing the other functional units (i.e., the input output service processing unit 110 and the web service processing unit 120, etc.).

Therefore, in the service providing system 10 according to the present embodiment, it is possible to reduce the development labor hours in the case of performing the addition, etc., of the external storage system 30 that is the cooperation destination of the service providing system 10. Note that the addition, etc., of the external service cooperating unit 140 may be performed by using a Software Development Kit (SDK).

Furthermore, the external service cooperating unit 140 is realizes the common I/F 1411 and the unique I/F 1412 by different modules, etc. Furthermore, the API defined by the common I/F 1411 and the unique I/F 1412 may be used by specifying an external service name (that is, the "external service name" is the variable part).

Therefore, in the service providing system 10 according to the present embodiment, when adding the external storage system 30 to be the cooperation destination of the service providing system 10, the common I/F 1411 included in another external service cooperating unit 140 can be reused. That is, when adding the external storage system 30 to be the cooperation destination, only the unique I/F 1412 needs to be developed. Accordingly, in the service providing system 10 according to the present embodiment, the development labor hours when adding the external storage system 30 to be the cooperation destination can be further reduced. Note that the same applies with respect to the common I/F 1421 and the unique I/F 1422.

The application information storage unit 150 stores the application information 1000. The application information 1000 is stored in the application information storage unit 150, in association with an application ID for uniquely identifying the application information 1000.

Here, the application information 1000 includes one or more of the process flow information items 1100. For example, the application information 1000 for providing a scan delivery service includes the process flow information $1100_1$ for realizing a service of performing scan delivery to a storage A and the process flow information $1100_2$ for realizing a service of performing scan delivery to a storage B, etc.

As described above, the process flow information 1100 is information defining a sequence of processes (process flow) for realizing a service provided by the application information 1000. Note that details of the process flow information 1100 are described below.

The screen information storage unit 160 stores the screen information 2000. The screen information 2000 is stored in the screen information storage unit 160, in association with an application ID and a flow ID for uniquely identifying the process flow information 1100 in the application information 1000. Note that details of the screen information 2000 are described below.

Figure 6:
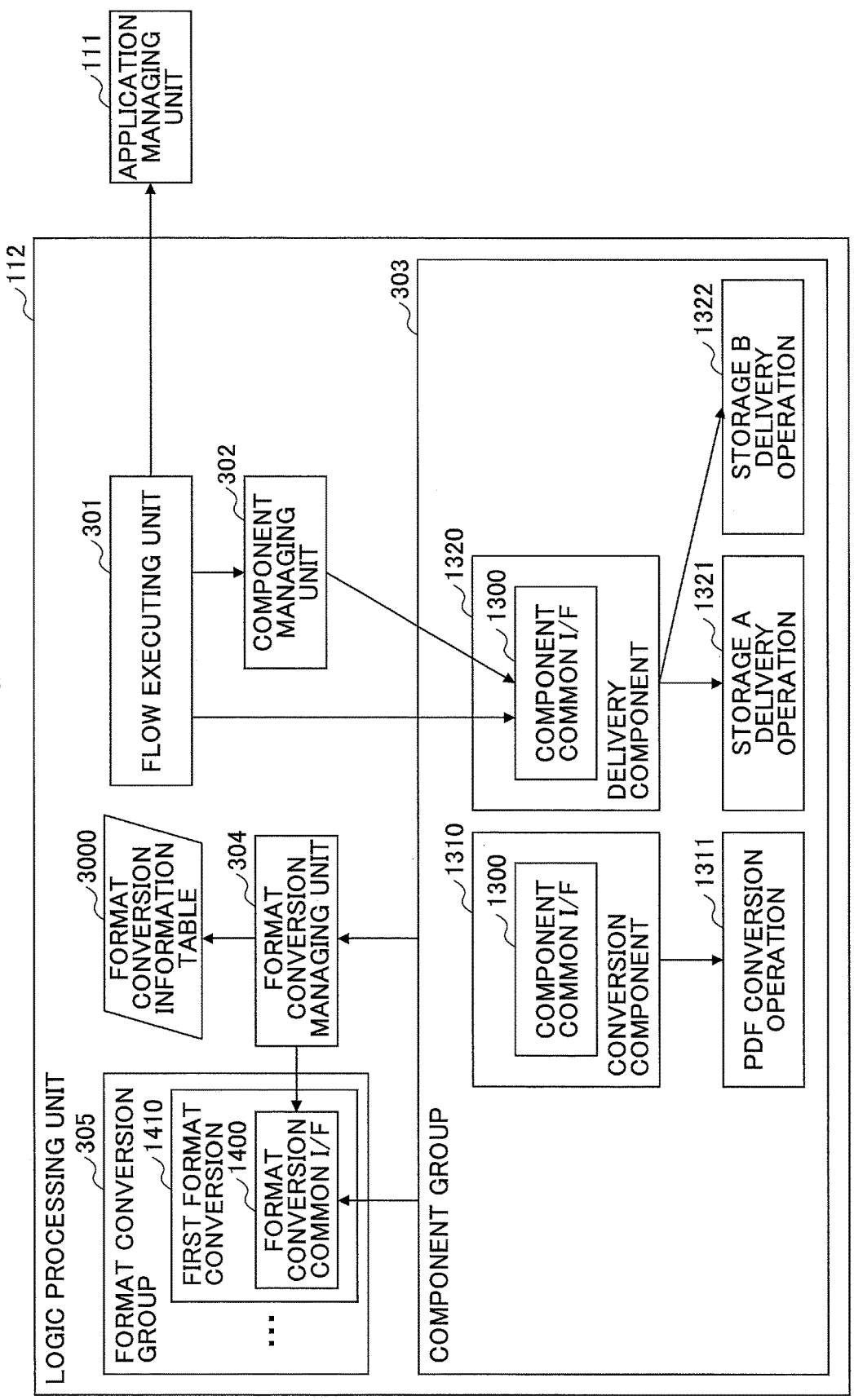
FIG. 6 illustrates an example of a functional configuration of a logic processing unit according to the first embodiment of the present invention.

Here, a description is given of details of the functional configuration of the logic processing unit 112, by referring to FIG. 6. FIG. 6 illustrates an example of a functional configuration of the logic processing unit 112 according to the first embodiment.

The logic processing unit 112 according to the present embodiment includes a flow executing unit 301, a component managing unit 302, a component group 303, a format conversion managing unit 304, and a format conversion group 305. Furthermore, the logic processing unit 112 according to the present embodiment uses a format conversion information table 3000.

When the flow executing unit 301 receives a process execution request from the browser 210 via the web service processing unit 120, the flow executing unit 301 acquires the process flow information 1100 included in the application information 1000 from the application managing unit 111. Then, the flow executing unit 301 executes a sequence of processes (process flow) based on the acquired process flow information 1100.

Here, a sequence of processes (process flow) based on the acquired process flow information 1100 is realized by combining processes executed by operations generated by a component.

Note that a component is a program (module) for generating one or more operations and requesting the generated operations to execute processes. For example, a component is defined by a class and a function, etc. Furthermore, an operation is a program (module) for executing a predetermined process. For example, an operation is defined by a subclass and a subfunction (subroutine) of a component. Note that an operation may be defined by a class and a function, etc., similar to a component.

The component managing unit 302 manages a component. The component managing unit 302 returns a component in response to a request from the flow executing unit 301.

The component group 303 is an assembly of components. The component group 303 includes a conversion component 1310 for generating a PDF conversion operation 1311. Furthermore, the component group 303 includes a delivery component 1320 for generating a storage A delivery operation 1321 and a storage B delivery operation 1322.

Here, the PDF conversion operation 1311 is a program (module) for performing a process of converting the data format of electronic data into a PDF format. Furthermore, the storage A delivery operation 1321 is a program (module) for performing a process of storing (uploading) an electronic file in a specified folder in the storage A. Similarly, the storage B delivery operation 1322 is a program (module) for performing a process of storing (uploading) an electronic file in a specified folder in the storage B.

As described above, by setting the component and the operation as different programs, a process common to operations can be performed by the component. For example, a process common to the storage A delivery operation 1321 and the storage B delivery operation 1322 (for example, a process of authenticating an external service) can be performed by the delivery component 1320.

Each component included in the component group 303 is generated by the component managing unit 302, for example, when the service providing system 10 is activated. Note that generating a component means, for example, loading a component defined by a class in a memory (for example, the RAM 14).

Note that the component group 303 also includes, for example, an acquisition component for generating a storage A acquisition operation for performing a process of acquiring (downloading) an electronic file specified by the storage A, other than the above components.

Here, in the present embodiment, the component group 303 includes, for each function (for example, a function of "delivery to an external service" and a function of "PDF conversion"), a component for providing the corresponding function; however, the component group is not so limited. That is, for example, the component group 303 may include a storage A component for generating a storage A delivery operation and a storage A acquisition operation, etc. In this way, the component group 303 may include a component for generating an operation for performing a process of uploading and downloading information to an external service, for each external service.

Furthermore, each component included in the component group 303 includes a component common I/F 1300. The component common I/F 1300 is an API that is commonly defined for the components, and includes an API for generating a component and an API for requesting to generate an operation and execute a process.

As described above, the components include the component common I/F 1300, and therefore the influence caused by the addition, etc., of a component can be localized. That is, for example, the addition, etc., of a component can be performed without influencing the flow executing unit 301 or the component managing unit 302, etc. Accordingly, in the service providing system 10 according to the present embodiment, the development labor hours associated with the addition, etc., of a component can be reduced.

Note that the component managing unit 302 generates the components to be included in the component group 303 according to the component common I/F 1300, for example, when the service providing system 10 is activated.

The format conversion managing unit 304 manages the format conversion of the data format. Here, the data format that each operation can handle is defined in advance. Therefore, in response to a request from an operation, the format conversion managing unit 304 refers to the format conversion information table 3000, for example, as illustrated in FIG. 7, and generates a format conversion to be included in the format conversion group 305.

Then, the format conversion managing unit 304 requests the generated format conversion to execute a format conversion process. Note that format conversion is a program (module) for executing a format conversion process of converting the data format, and is defined by, for example, a class and a function, etc. Furthermore, the generation of format conversion means, for example, to load the format conversion defined by a class, in a memory (for example, the RAM 14).

Here, examples of data formats are a data format "InputStream" indicating stream data, "LocalFilePath" indicating the path (address) of the electronic file stored in a storage device, etc., and "File" indicating the entity of an electronic file, etc.

The format conversion group 305 is an assembly of format conversions. The format conversion group 305 includes a first format conversion 1410 for converting the data format "InputStream" into "LocalFilePath". Note that the format conversion group 305 also includes a second format conversion for converting, for example, the data format "LocalFilePath" to "File".

Furthermore, each format conversion included in the format conversion group 305 includes a format conversion common I/F 1400. The format conversion common I/F 1400 is an API that is commonly defined for the format conversions, and includes an API for generating a format conversion and an API for requesting to execute a process to the format conversion.

As described above, the format conversions include the format conversion common I/F 1400, and therefore the influence caused by the addition, etc., of a format conversion can be localized. That is, for example, the addition, etc., of a format conversion can be performed without influencing the format conversion managing unit 304, etc. Accordingly, in the service providing system 10 according to the present embodiment, the development labor hours associated with the addition, etc., of a format conversion can be reduced.

Here, a description is given of the process flow information 1100 defining a sequence of processes (process flow) for realizing the scan delivery service according to the present embodiment, by referring to FIG. 8. FIG. 8 illustrates an example of the process flow information 1100.

The process flow information 1100 illustrated in FIG. 8 defines a process definition indicating the respective processes forming a sequence of processes (process flow) for realizing the scan delivery service according to the present embodiment. Note that the process definition is defined in the format of "component name: operation name? operation parameter".

The process flow information 1100 illustrated in FIG. 8 includes a flow ID 1101, a process definition 1102, and a process definition 1103.

The flow ID 1101 is identification information for uniquely identifying the process flow information 1100 in the application information 1000.

The process definition 1102 defines "conversion:pdf", and defines to execute a process of the PDF conversion operation 1311 of the conversion component 1310.

The process definition 1103 defines "send_to_storage: storage", and defines to execute a process of the storage A delivery operation 1321 of the delivery component 1320.

Furthermore, the process definition 1103 defines an option parameter "targetfolder=folder1" and a "filename=sample". That is, the process definition 1103 defines to store (upload) an electronic file by a file name "sample" in a folder "folder1" of the storage A.

As described above, the process flow information 1100 includes a flow ID of the process flow information 1100 and one or more process definitions. Accordingly, the service providing system 10 according to the present embodiment is able to execute a sequence of processes for realizing a service, by executing processes complying with process definitions included in the process flow information 1100 by the operations.

Note that the processes defined in the process flow information 1100 illustrated in FIG. 8 are executed in an order starting from the top process. That is, the processes in a sequence of processes (process flow) based on the process flow information 1100 in FIG. 8 are executed in the order of the process defined in the process definition 1102 and the process defined in the process definition 1103. However, the order of executing the processes is not so limited; for example, the process flow information 1100 may include information defining the order of executing the processes.

<Process Details>

Figure 9:
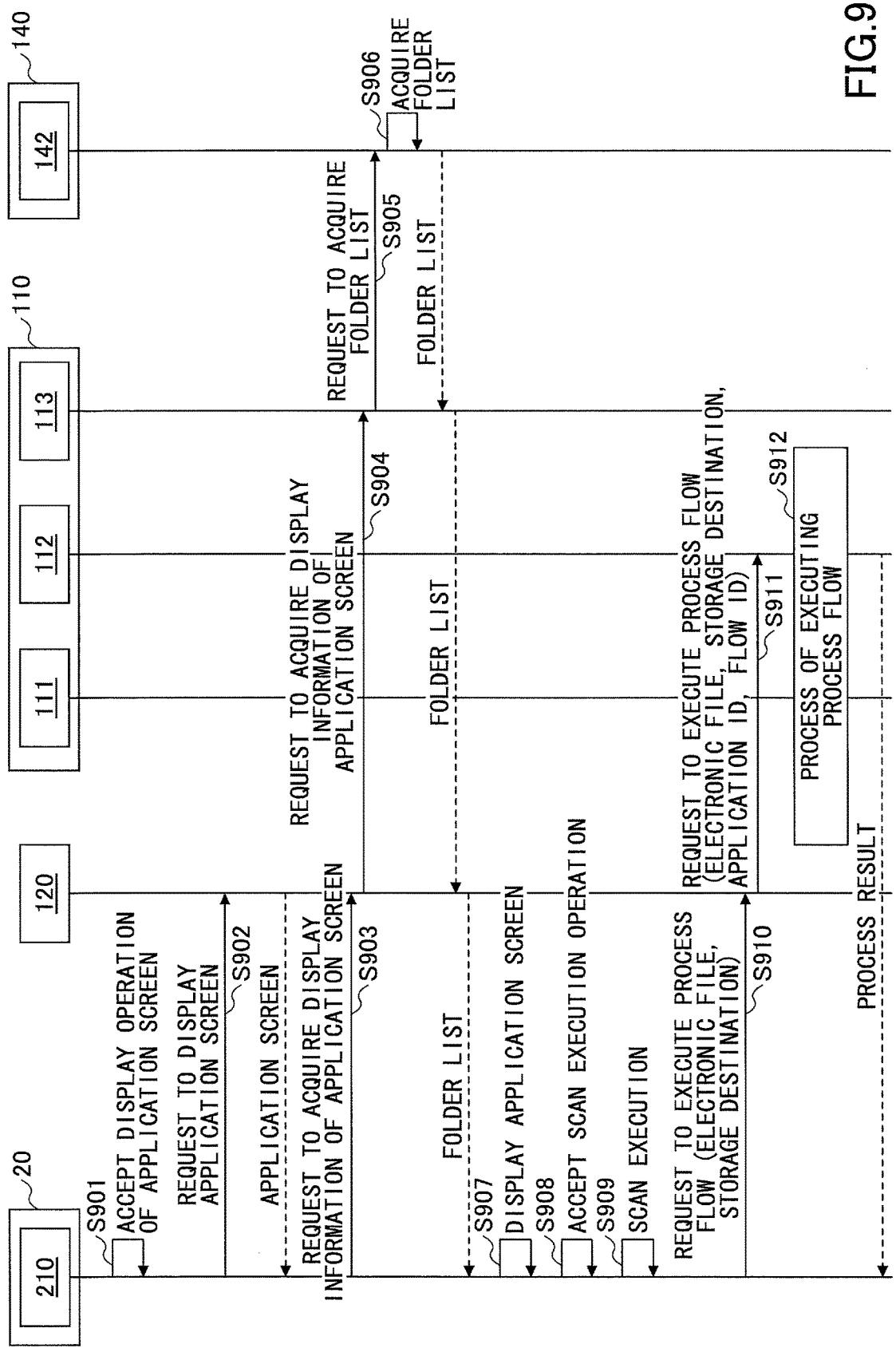
FIG. 9 is a sequence diagram of an example of the overall process of a scan delivery service according to the first embodiment of the present invention.

Next, a description is given of details of processes by the information processing system 1 according to the present embodiment. In the following, a description is given of the overall process in a case where the user of the device 20 uses a scan delivery service of performing scan delivery with respect to the storage A, by referring to FIG. 9. FIG. 9 is a sequence diagram of an example of the overall process of the scan delivery service according to the first embodiment.

First, the browser 210 of the device 20 accepts a display operation of an application screen of the scan delivery service (step S901).

When the display operation is accepted, the browser 210 of the device 20 sends a request to display the application screen to the web service processing unit 120 (step S902). Then, the web service processing unit 120 acquires the screen information 2000 for displaying the application screen from the screen information storage unit 160, and returns the screen information 2000 to the browser 210.

Here, a description is given of the screen information 2000 for displaying the application screen of the scan delivery service, by referring to FIG. 10. FIG. 10 illustrates an example of the screen information 2000.

The screen information 2000 illustrated in FIG. 10 is information defined in the HTML format. The screen information 2000 includes an INPUT tag 2001 displaying a text box for inputting a file name, a SELECT tag 2002 displaying a selection field of the storage destination folder, and a BUTTON tag 2003 displaying a button for executing scanning.

Accordingly, as described below, the application screen of the scan delivery service is displayed by defining information of each folder included in a folder list acquired from the external storage system 30, as selection elements, in the SELECT tag 2002 of the screen information 2000.

When the screen information 2000 is received, the browser 210 of the device 20 sends a request to acquire display information of the application screen to the web service processing unit 120 (step S903).

Note that display information means, for example, each selection element included in the selection field of the application screen. In the present embodiment, a folder list of the storage A to be the delivery destination (storage destination) of electronic files in the scan delivery service, is acquired as a selection element.

When the request to acquire display information of the application screen is received, the web service processing unit 120 sends the acquisition request to the data I/F unit 113 (step S904).

When the acquisition request is received, the data I/F unit 113 sends the request to acquire a folder list of the storage A to the data processing unit 142 of the external service cooperating unit 140 (step S905). Note that the data I/F unit 113 sends the request to acquire a folder list of the storage A, to the data processing unit 142 of the external service cooperating unit $140_1$ corresponding to the storage A (external storage system $30_1$).

When the request to acquire a folder list of the storage A is received, the data processing unit 142 of the external service cooperating unit 140 sends the request to acquire a folder list to the external storage system 30, and acquires the folder list (step S906). Then, the data processing unit 142 returns the acquired folder list to the browser 210, via the data I/F unit 113 and the web service processing unit 120.

Note that when the request to acquire a folder list is received from the data I/F unit 113, the data processing unit 142 uses the API defined in the common I/F 1421 or the unique I/F 1422, to send a request to acquire the folder list, to the corresponding external storage system 30. That is, for example, the data processing unit 142 uses the API defined in the common I/F 1421 as "storageA/data/folders" to send a request to acquire the folder list to the external storage system $30_1$.

When the folder list is received, the browser 210 of the device 20 displays the application screen on the operation panel 22, based on the screen information 2000 and the folder list (step S907). That is, for example, the browser 210 defines each folder ID included in the folder list as a value (VALUE) in the OPTION tag in the SELECT tag 2002 of the screen information 2000 of FIG. 10, and displays the application screen based on the screen information 2000.

Accordingly, on the operation panel 22 of the device 20, an application screen 2100 illustrated in FIG. 11 is displayed by the browser 210. FIG. 11 illustrates an example of the application screen 2100.

The application screen 2100 illustrated in FIG. 11 is a screen for using a scan delivery service of performing scan delivery with respect to the storage A. The application screen 2100 includes a text box 2101 for inputting a file name of an electronic file, a selection field 2102 for selecting a storage destination folder in the storage A, and a scan button 2103 for executing scanning.

When a user inputs a file name in the text box 2101, selects a storage destination folder from the selection field 2102, and presses the scan button 2103, the browser 210 of the device 20 accepts the operation (step S908).

When the operation is accepted, next, the browser 210 of the device 20 reads an original document by the scanner 26, and generates an electronic file (image file) to which the file name input to the text box 2101 is applied (step S909).

When the electronic file is generated, next, the browser 210 of the device 20 sends, to the web service processing unit 120, a request to execute a process flow, including the electronic file and a folder ID of the storage destination folder selected from the selection field 2102 (step S910).

When the request to execute a process flow is received, the web service processing unit 120 includes, in the execution request, an application ID of the application information 1000 providing the scan delivery service of performing scan delivery with respect to the storage A, and a flow ID of the process flow information 1100 realizing the service. Then, the web service processing unit 120 sends the request to execute a process flow including the electronic file, the folder ID of the storage destination folder, the application ID, and the flow ID, to the logic processing unit 112 (step S911).

Here, for example, the web service processing unit 120 is to acquire the application ID and the flow ID associated with the application screen 2100 and the scan button 2103, and include the acquired information in the request to execute a process flow. That is, for example, the browser 210 sends, to the web service processing unit 120, the request to execute a process flow including identification information of the application screen 2100 and the scan button 2103 (for example, a screen ID and a button ID, etc.). Then, the web service processing unit 120 is to acquire the application ID and the flow ID associated with the identification information, and include the acquired application ID and flow ID in the request to execute a process flow.

However, the present embodiment is not so limited. For example, in step S910, the browser 210 may send the request to execute a process flow including the above application ID and flow ID, to the web service processing unit 120.

When the request to execute a process flow is received, next, the logic processing unit 112 performs a process of executing the process flow (step S912). That is, the logic processing unit 112 acquires the process flow information 1100 corresponding to the application ID and the flow ID included in the execution request, and executes a sequence of processes (process flow) based on the acquired process flow information 1100. Note that details of the process of executing the process flow are described below.

Then, the logic processing unit 112 returns the process result of sequence of processes to the browser 210.

Accordingly, in the information processing system 1 according to the present embodiment, the service providing system 10 provides various services realized by a sequence of processes (process flow) based on the process flow information 1100.

In the following, a description is given of details of the process of step S912 in FIG. 9, by referring to FIG. 12. FIG. 12 is a sequence diagram of an example of a process of executing a process flow according to the first embodiment.

When the request to execute a process flow is received, the flow executing unit 301 acquires the application ID and the flow ID from the execution request. Then, the flow executing unit 301 sends a request to acquire process flow information including the application ID and the flow ID, to the application managing unit 111 (step S1201). Then, the application managing unit 111 acquires the process flow information 1100 corresponding to the application ID and the flow ID included in the acquisition request, from the application information storage unit 150, and returns the process flow information 1100 to the flow executing unit 301.

Here, in the following description, it is assumed that the application managing unit 111 has returned the process flow information 1100 illustrated in FIG. 8, to the flow executing unit 301. Note that the option parameters "targetfolder=folder1" and "filename=sample" in the process flow information 1100 of FIG. 8 are defined by the application managing unit 111, for example, based on the folder ID of the storage destination folder and the file name included in the request to acquire the process flow information. However, the operation parameters may be defined by the flow executing unit 301.

Next, the flow executing unit 301 sends a request to acquire a component to the component managing unit 302, based on the process flow information 1100 received from the application managing unit 111 (step S1202). That is, the flow executing unit 301 sends a request to acquire a component including the process definition 1102 in the process flow information 1100 of FIG. 8, to the component managing unit 302.

Then, the component managing unit 302 returns the conversion component 1310 corresponding to a component name "conversion" in the process definition 1102, to the flow executing unit 301. Note that, for example, the component managing unit 302 is to return an address in a memory (for example, the RAM 14) in which the conversion component 1310 is loaded, to the flow executing unit 301.

When the conversion component 1310 is returned from the component managing unit 302, next, the flow executing unit 301 sends a process execution request specifying the process definition 1102 of the process flow information 1100 in FIG. 8, to the conversion component 1310 (step S1203).

Here, the process execution request includes data (data format "InputStream") indicating the electronic file received from the browser 210. In this way, the flow executing unit 301 sends the electronic file received from the browser 210 as "data" (without considering the data format), to the conversion component 1310. In the following, an electronic file, etc., which is sent without considering the data format as described above, is expressed as "data".

When the process execution request is received, the conversion component 1310 generates the PDF conversion operation 1311 corresponding to an operation name "pdf" of the process definition 1102 specified in the process execution request (step S1204).

When the PDF conversion operation 1311 is generated, the conversion component 1310 sends the process execution request to the PDF conversion operation 1311 (step S1205). Note that the conversion component 1310 is to send the process execution request received from the flow executing unit 301 in step S1203, to the PDF conversion operation 1311.

When the process execution request is received, the PDF conversion operation 1311 sends a format conversion request to the format conversion managing unit 304 (step S1206). Here, the format conversion request includes the data included in the process execution request and a specification of "LocalFilePath" indicating the data format that can be handled by the PDF conversion operation 1311.

When the format conversion request is received, the format conversion managing unit 304 checks whether the data format of the data included in the format conversion request matches the specified data format (step S1207).

Here, the data format of the data included in the format conversion request is "InputStream", whereas the specified data format is "LocalFilePath". Therefore, the format conversion managing unit 304 determines that the data format of the data included in the format conversion request does not match the specified data format.

Then, the format conversion managing unit 304 refers to the format conversion information table 3000, and generates the first format conversion 1410 for converting the data format "InputStream" to the data format "LocalFilePath" (step S1208).

When the first format conversion 1410 is generated, the format conversion managing unit 304 sends a request to execute a format conversion process to the first format conversion 1410 (step S1209). Here, the execution request includes data having the data format "InputStream".

When the request to execute a format conversion process is received, the first format conversion 1410 performs a format conversion process of converting the data format of the data included in the execution request from "InputStream" to "LocalFilePath" (step S1210). Then, the first format conversion 1410 returns the data after the format conversion, to the format conversion managing unit 304.

When the data after the format conversion is received, the format conversion managing unit 304 sends the data to the PDF conversion operation 1311 (step S1211).

The PDF conversion operation 1311 executes a process on the data received from the format conversion managing unit 304 (step S1212). That is, the PDF conversion operation 1311 converts the data format of the electronic file indicated by the data into a PDF format, by the PDF converting unit 131 of the document service unit 130.

Then, the PDF conversion operation 1311 returns the data indicating the process result to the flow executing unit 301 via the conversion component 1310. Note that the data returned here is data (data format "LocalFilePath") indicating the electronic file converted into a PDF format by the PDF conversion operation 1311.

Next, the flow executing unit 301 sends a request to acquire a component to the component managing unit 302, based on the process flow information 1100 received from the application managing unit 111 in step S1201 (step S1213). That is, the flow executing unit 301 sends a request to acquire a component including the process definition 1103 in the process flow information 1100 of FIG. 8, to the component managing unit 302.

Then, the component managing unit 302 returns the delivery component 1320 corresponding to a component name "send_to_storage" of the process definition 1103, to the flow executing unit 301. Note that the component managing unit 302 is to return an address in a memory (for example, the RAM 14) in which the delivery component 1320 is loaded, to the flow executing unit 301.

When the delivery component 1320 is returned from the component managing unit 302, next, the flow executing unit 301 sends a process execution request specifying the process definition 1103 in the process flow information 1100 of FIG. 8, to the delivery component 1320 (step S1214).

Here, the process execution request includes data (data format "LocalFilePath") indicating the process result obtained by the PDF conversion operation 1311.

When the process execution request is received, the delivery component 1320 generates the storage A delivery operation 1321 corresponding to an operation name "storageA" in the process definition 1103 specified in the process execution request (step S1215).

When the storage A delivery operation 1321 is generated, the delivery component 1320 sends the process execution request to the storage A delivery operation 1321 (step S1216). Note that the delivery component 1320 is to send the process execution request received from the flow executing unit 301 in step S1214, to the storage A delivery operation 1321.

When the process execution request is received, the storage A delivery operation 1321 sends a format conversion request to the format conversion managing unit 304 (step S1217). Here, the format conversion request includes the data included in the process execution request and a specification of "LocalFilePath" indicating the data format that can be handled by the storage A delivery operation 1321.

When the format conversion request is received, the format conversion managing unit 304 checks whether the data format of the data included in the format conversion request matches the specified data format (step S1218).

Here, the data format of the data included in the format conversion request is "LocalFilePath", and the specified data format is also "LocalFilePath". Therefore, the format conversion managing unit 304 determines that the data format of the data included in the format conversion request matches the specified data format.

Then, the format conversion managing unit 304 sends the data included in the format conversion request to the storage A delivery operation 1321 (step S1219). In this way, in the operation of checking the data format (process of step S1218), when the data format of the data and the specified data format are determined to match each other, the format conversion managing unit 304 does not generate a format conversion.

The storage A delivery operation 1321 executes a process with respect to the data received from the format conversion managing unit 304 (step S1220). That is, the storage A delivery operation 1321 stores the electronic file (electronic file in PDF format) indicated by the data in a specified folder in the external storage system $30_1$, by the file processing unit 141 of the external service cooperating unit $140_1$.

More specifically, for example, the storage A delivery operation 1321 uses the API defined in the common I/F 1411 as "storage/process/folder", to store the electronic file in the external storage system $30_1$.

Then, the storage A delivery operation 1321 returns data indicating the process result to the flow executing unit 301 via the delivery component 1320. Note that the data returned here is data indicating that the storage A delivery operation 1321 has stored the electronic file in the external storage system $30_1$.

As described above, in the information processing system 1 according to the present embodiment, a sequence of processes (process flow) for realizing various services provided by the service providing system 10, is executed. At this time, the service providing system 10 according to the present embodiment executes a sequence of processes, as the operations generated by the component execute various processes.

Therefore, the service providing system 10 according to the present embodiment is able to provide various services by combing processes executed by operations. Therefore, for example, the developer, etc., of the application (application information 1000) is able to easily develop an application for providing various services, by defining a component name and an operation name in the process flow information 1100.

Second Embodiment

Next, a description is given of a second embodiment. The service providing system 10 according to the second embodiment is different from the service providing system 10 according to the first embodiment in that when executing each of the processes included in the sequence of processes, the service providing system 10 according to the second embodiment generates a component and an operation required for executing each of the processes. Therefore, the service providing system 10 according to the second embodiment does not generate a component when the service providing system 10 is activated.

Accordingly, the service providing system 10 according to the second embodiment is able to efficiently use hardware resources such as a memory (for example, the RAM 14), etc., because only a component required for executing the process flow is generated.

Note that in the second embodiment, the elements having the substantially the same functions as those of the first embodiment, and the same processes as those of the first embodiment, are denoted by the same reference numerals as those of the first embodiment and redundant descriptions are omitted.

<Process Details>

Figure 13:
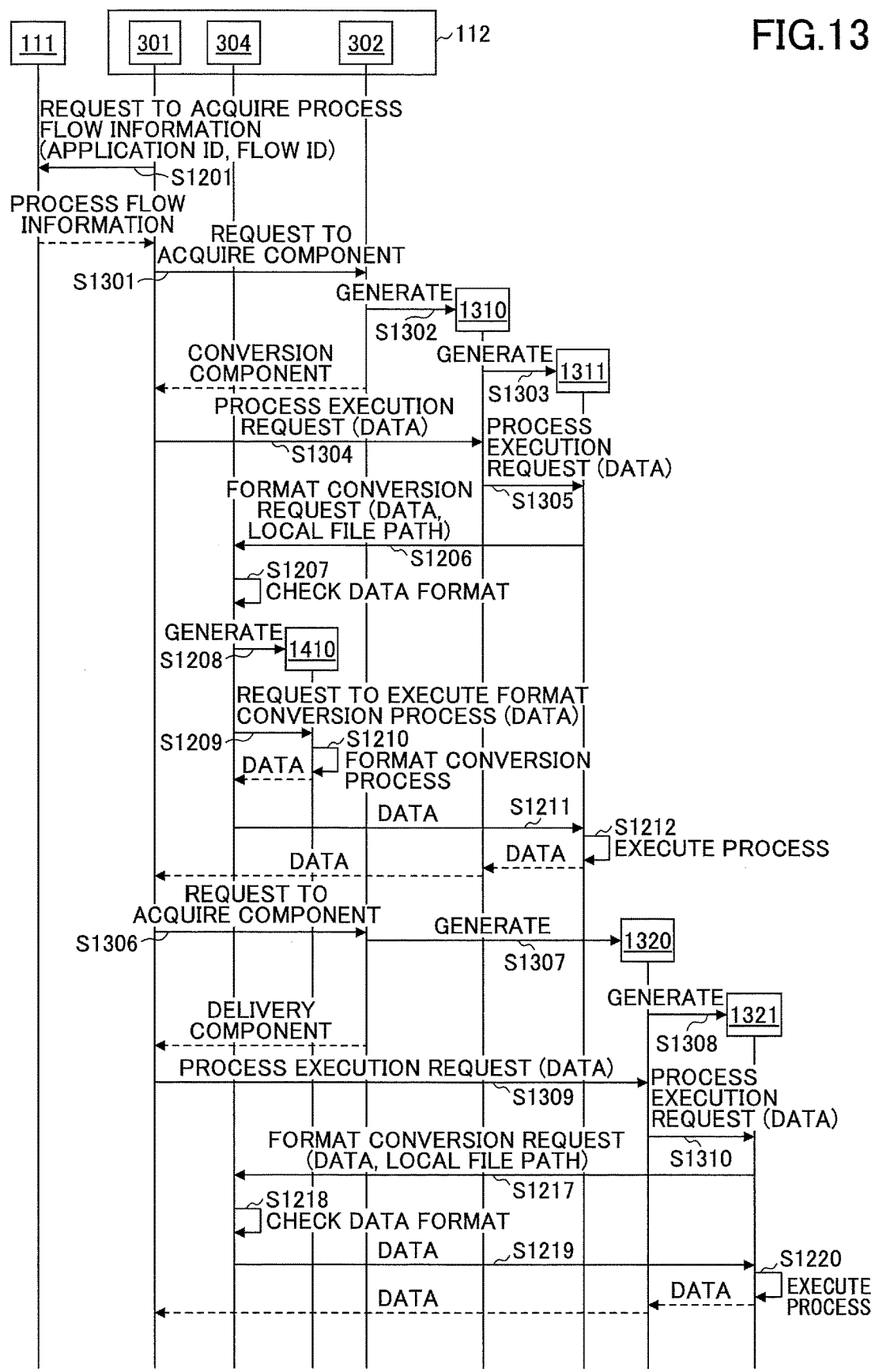
FIG. 13 is a sequence diagram of an example of a process of executing a process flow according to a second embodiment of the present invention.

Next, a description is given of details of the process of executing a process flow according to the present embodiment, by referring to FIG. 13. FIG. 13 is a sequence diagram of an example of a process of executing a process flow according to the second embodiment.

When the process flow information 1100 is received from the application managing unit 111, the flow executing unit 301 sends a request to acquire a component to the component managing unit 302 based on the process flow information 1100 (step S1301).

Note that it is assumed that the flow executing unit 301 has received the process flow information 1100 illustrated in FIG. 8 from the application managing unit 111. In this case, the flow executing unit 301 sends a request to acquire a component including the process definition 1102 in the process flow information 1100 of FIG. 8, to the component managing unit 302.

When a request to acquire a component is received, the component managing unit 302 generates the conversion component 1310 corresponding to a component name "conversion" in the process definition 1102 included in the acquisition request (step S1302).

When the conversion component 1310 is generated by the component managing unit 302, next, the conversion component 1310 generates the PDF conversion operation 1311 corresponding to an operation name "pdf" of the process definition 1102 (step S1303).

Then, the component managing unit 302 returns the generated conversion component 1310 to the flow executing unit 301.

When the conversion component 1310 is returned from the component managing unit 302, the flow executing unit 301 sends a process execution request specifying the process definition 1102 in the process flow information 1100 of FIG. 8, to the conversion component 1310 (step S1304). Here, the process execution request includes data indicating the electronic file received from the browser 210.

When the process execution request is received from the flow executing unit 301, the conversion component 1310 sends the process execution request to the PDF conversion operation 1311 (step S1305).

The processes of the subsequent steps S1206 through S1212 are the same as those of the first embodiment, and therefore descriptions are omitted.

The flow executing unit 301 sends the request to acquire a component to the component managing unit 302, based on the process flow information 1100 received from the application managing unit 111 in step S1201 (step S1306). That is, the flow executing unit 301 sends the request to acquire a component including the process definition 1103 of the process flow information 1100 in FIG. 8, to the component managing unit 302.

When the request to acquire a component is received, the component managing unit 302 generates the delivery component 1320 corresponding to a component name "send_to_storage" of the process definition 1103 included in the acquisition request (step S1307).

When the delivery component 1320 is generated by the component managing unit 302, next, the delivery component 1320 generates the storage A delivery operation 1321 corresponding to an operation name "storageA" in a process definition 1104 (step S1308).

Then, the component managing unit 302 returns the generated delivery component 1320 to the flow executing unit 301.

When the delivery component 1320 is returned from the component managing unit 302, the flow executing unit 301 sends a process execution request specifying the process definition 1103 of the process flow information 1100 in FIG. 8, to the delivery component 1320 (step S1309). Here, the process execution request includes data indicating the process result obtained by the PDF conversion operation 1311.

When the process execution request is received from the flow executing unit 301, the delivery component 1320 sends the process execution request to the storage A delivery operation 1321 (step S1310).

The processes of the subsequent steps S1217 through S1220 are the same as those of the first embodiment, and therefore descriptions are omitted.

As described above, in the information processing system 1 according to the present embodiment, a sequence of processes (process flow) for realizing various services provided by the service providing system 10, is executed. At this time, the service providing system 10 according to the present embodiment generates a component and an operation required for executing the processes, when executing each of the processes included in the sequence of processes.

Accordingly, in the service providing system 10 according to the present embodiment, components and operations that are unnecessary for executing the process flow are not generated. Therefore, the service providing system 10 according to the present embodiment is able to efficiently use hardware resources such as a memory (for example, the RAM 14), etc.

Third Embodiment

Next, a description is given of a third embodiment. The service providing system 10 according to the third embodiment is different from the service providing system 10 according to the second embodiment in that the service providing system 10 according to the third embodiment generates a component and an operation required for executing the process flow, when executing the process flow.

Accordingly, the service providing system 10 according to the third embodiment is able to efficiently use hardware resources such as a memory (for example, the RAM 14), etc., similar to the second embodiment.

Note that in the third embodiment, the elements having the substantially the same functions as those of the second embodiment, and the same processes as those of the second embodiment, are denoted by the same reference numerals as those of the second embodiment and redundant descriptions are omitted.

<Process Details>

Figure 14:
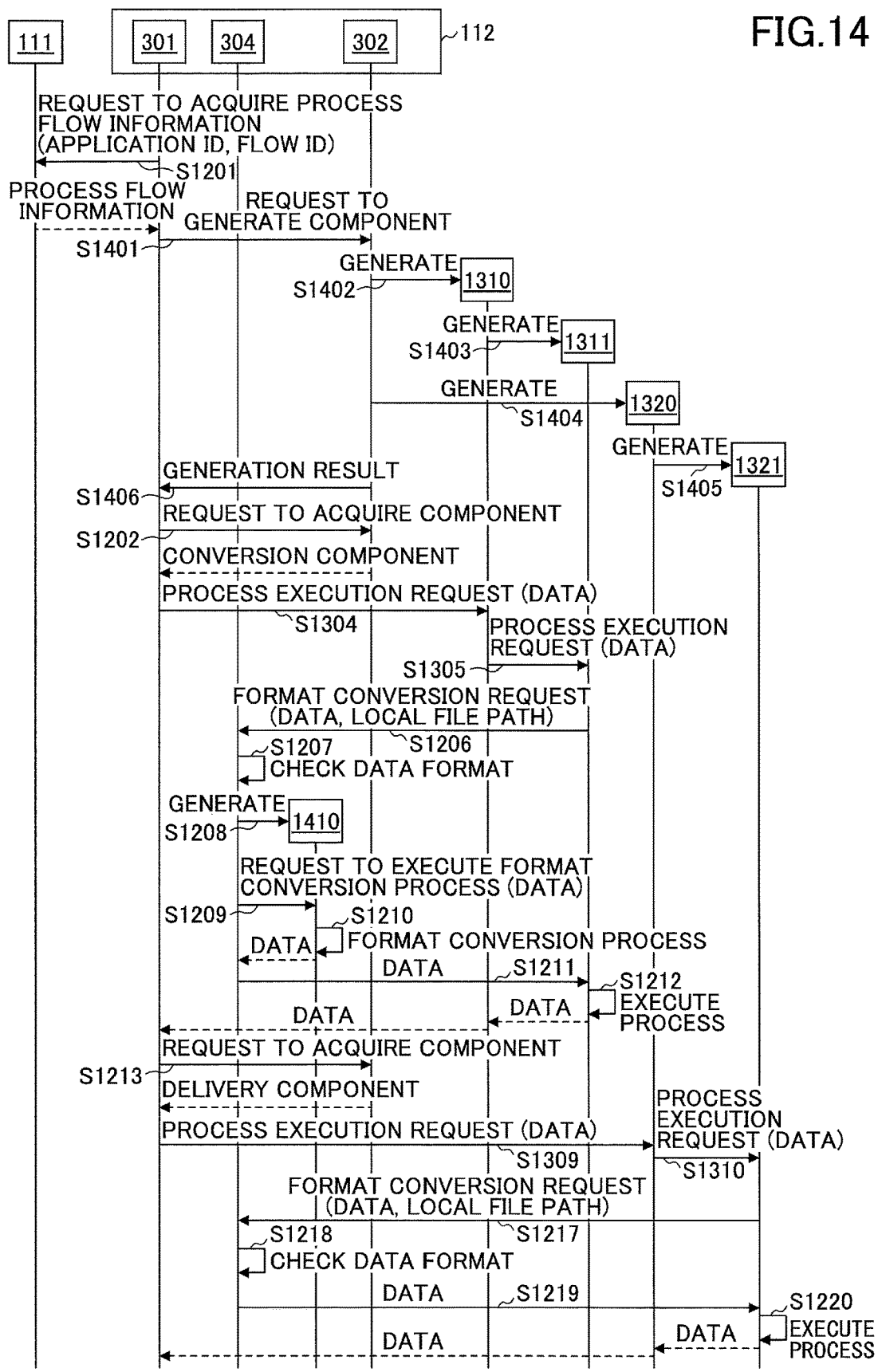
FIG. 14 is a sequence diagram of an example of a process of executing a process flow according to a third embodiment of the present invention.

In the following, a description is given of details of the process of executing a process flow according to the present embodiment, by referring to FIG. 14. FIG. 14 is a sequence diagram of an example of a process of executing a process flow according to the third embodiment.

When the process flow information 1100 is received from the application managing unit 111, the flow executing unit 301 sends a request to generate a component to the component managing unit 302 based on the process flow information 1100 (step S1401).

Note that it is assumed that the flow executing unit 301 has received the process flow information 1100 illustrated in FIG. 8 from the application managing unit 111. In this case, the flow executing unit 301 sends a request to generate a component including the process definition 1102 and the process definition 1103, to the component managing unit 302.

When a request to generate a component is received, the component managing unit 302 generates the conversion component 1310 corresponding to a component name "conversion" in the process definition 1102 included in the generation request (step S1402).

When the conversion component 1310 is generated by the component managing unit 302, next, the conversion component 1310 generates the PDF conversion operation 1311 corresponding to an operation name "pdf" of the process definition 1102 (step S1403).

Furthermore, the component managing unit 302 generates the delivery component 1320 corresponding to a component name "send_to_storage" of the process definition 1103 included in the component generation request (step S1404).

When the delivery component 1320 is generated by the component managing unit 302, next, the delivery component 1320 generates the storage A delivery operation 1321 corresponding to an operation name "storageA" in a process definition 1103 (step S1405).

Then, when the components have been generated, the component managing unit 302 returns a generation result indicating that the components have been generated, to the flow executing unit 301 (step S1406).

The processes of the subsequent step S1202, step S1304, step S1305, steps S1206 through S1213, step S1309, step S1310, and steps S1217 through S1220 are the same as those of the second embodiment, and therefore descriptions are omitted.

As described above, in the information processing system 1 according to the present embodiment, a sequence of processes (process flow) for realizing various services provided by the service providing system 10, is executed. At this time, the service providing system 10 according to the present embodiment generates a component and an operation required for executing the sequence of processes, when executing the sequence of processes (process flow).

Accordingly, similar to the second embodiment, in the service providing system 10 according to the present embodiment, components and operations that are unnecessary for executing the process flow are not generated. Therefore, the service providing system 10 according to the present embodiment is able to efficiently use hardware resources such as a memory (for example, the RAM 14), etc.

Note that in the second embodiment and the third embodiment, the timings of generating the component and the operation are different from those of the first embodiment; however, the timings of generating the component and the operation are not so limited. For example, the service providing system 10 and may generate all of the components and operations when the service providing system 10 is activated. Furthermore, for example, the service providing system 10 may generate a component necessary for executing a process flow when executing the process flow, and generate an operation when executing each of the processes included in the process flow.

Furthermore, for example, the service providing system 10 may delete a component or an operation that is not used (that is, release the memory), when a predetermined time passes without using the generated component or operation.

Fourth Embodiment

Next, a description is given of a fourth embodiment. The service providing system 10 according to the fourth embodiment is different from the service providing system 10 according to the first embodiment in that the device 20 includes a client application instead of the browser 210.

Note that in the fourth embodiment, the elements having the substantially the same functions as those of the first embodiment, and the same processes as those of the first embodiment, are denoted by the same reference numerals as those of the first embodiment and redundant descriptions are omitted.

<Functional Configuration>

Figure 15:
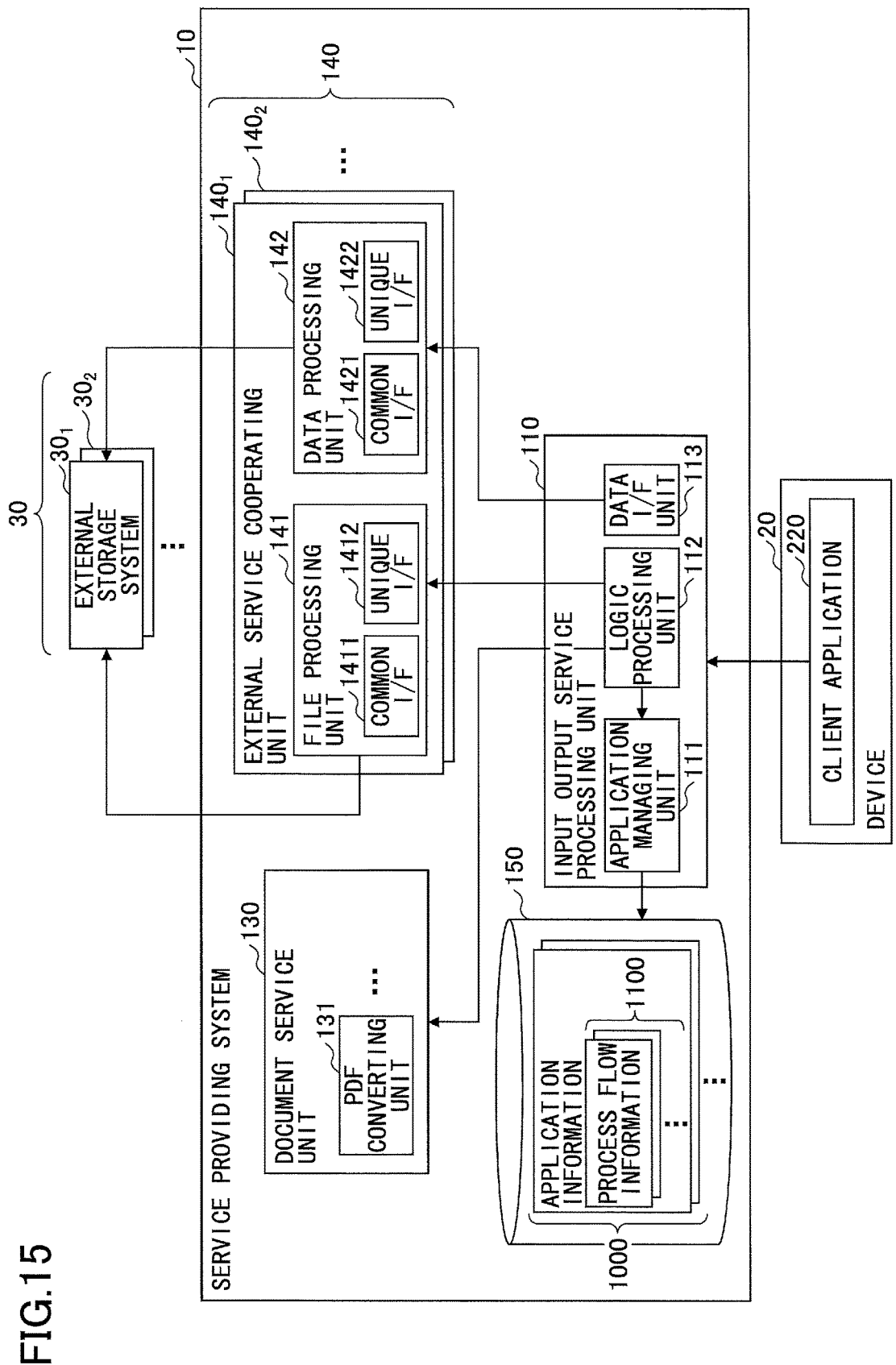
FIG. 15 illustrates a functional configuration of an example of the information processing system according to a fourth embodiment of the present invention.

First, a description is given of a functional configuration of the information processing system 1 according to the present embodiment, by referring to FIG. 15. FIG. 15 illustrates a functional configuration of an example of the information processing system 1 according to the fourth embodiment.

The device 20 according to the present embodiment includes a client application 220 executed by, for example, the CPU 31, etc. For example, the client application 220 is an exclusive-use application, etc., developed for using a service provided by the service providing system 10.

Furthermore, the service providing system 10 according to the present embodiment does not include the web service processing unit 120 or the screen information storage unit 160.

<Process Details>

Figure 16:
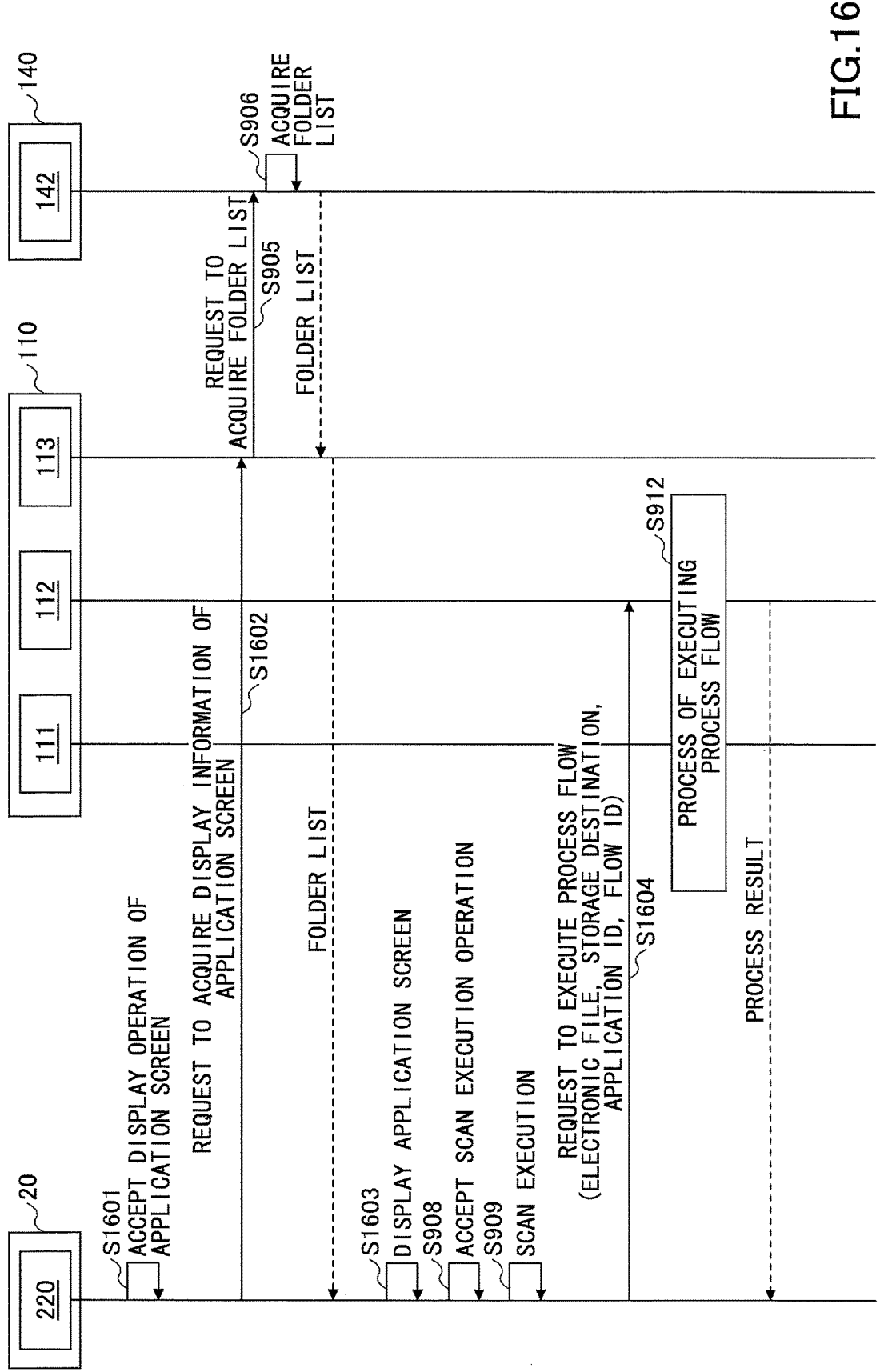
FIG. 16 is a sequence diagram of an example of the overall process of the scan delivery service according to the fourth embodiment of the present invention.

Next, a description is given of the overall process of a scan delivery service according to the present embodiment, by referring to FIG. 16. FIG. 16 is a sequence diagram of an example of the overall process of the scan delivery service according to the fourth embodiment.

First, the client application 220 of the device 20 accepts a display operation of an application screen of the scan delivery service (step S1601).

When the display operation is accepted, the client application 220 of the device 20 sends a request to acquire display information of the application screen, to the data I/F unit 113 (step S1602).

The processes of the subsequent steps S905 and S906 are the same as those of the first embodiment, and therefore descriptions are omitted.

When the folder list is received, the client application 220 of the device 20 displays the application screen on the operation panel 22, based on the folder list (step S1603). Accordingly, on the operation panel 22 of the device 20, the application screen 2100 illustrated in FIG. 10 is displayed, by the client application 220.

The processes of the subsequent steps S908 and S909 are the same as those of the first embodiment, and therefore descriptions are omitted.

When the electronic file is generated by scan execution, the client application 220 of the device 20 sends a request to execute the process flow to the logic processing unit 112 (step S1604). Here, the execution request includes the generated electronic file, the folder ID of the selected storage destination folder, the application ID of the application information 1000 providing the scan delivery service, and the flow ID of the process flow information 1100 for realizing the service.

The processes of the subsequent steps S912 and onward are the same as those of the first embodiment, and therefore descriptions are omitted.

Accordingly, in the information processing system 1 according to the present embodiment, services provided by the service providing system 10 can be used by using the device 20 in which the client application 220 is installed.

According to one embodiment of the present invention, it is possible to support the development of an application for performing a sequence of processes.

The information processing system, the information processing apparatus, and the information processing method are not limited to the specific embodiments described in the detailed description, and variations and modifications may be made without departing from the spirit and scope of the present invention.

What is claimed is:

1. An information processing system for executing a sequence of processes using electronic data, the information processing system including one or more information processing apparatuses for implementing various functions of the information processing system, the information processing system comprising:
 a program storage configured to store, for each predetermined function, a program group including at least one first program for providing the predetermined function and one or more second programs for executing a predetermined process for implementing the predetermined function in response to a process execution request from the at least one first program;
 an application information storage configured to store, for each application for executing the sequence of processes, identification information for identifying the application and sequence-related information relating to the sequence of processes in association with each other, the sequence-related information defining the one or more second programs for executing each of the predetermined processes included in the sequence of processes;
 a processor that is configured to:
 accept a request from a device among one or more devices coupled to the information processing system, the request including the identification information and electronic data-related information relating to the electronic data to be used for executing the sequence of processes; and execute the sequence of processes using the electronic data based on the electronic data-related information included in the request, the sequence of processes being executed as each of the first programs, which corresponds to one of the one or more second programs defined in the sequence-related information stored in the application information storage in association with the identification information included in the request, makes the process execution request to the corresponding one of the one or more second programs to execute the predetermined process, said at least one first program functioning as a component that is configured to generate an operation and request the operation to execute a process of the operation, and execute for executing one or more processes that are common to the one or more second programs, and said one or more second programs functioning as operations that are generated by the component for executing processes that are unique to each of the one or more second programs, wherein the one or more second programs that are defined as one process flow in the sequence-related information include a program for executing a process relating to an external service, wherein the program for executing the process relating to the external service includes at least a program for executing a process of uploading the electronic data to the external service and a program for executing a process of downloading the electronic data from the external service, wherein the information processing system further comprises an external service cooperating unit including, for each of the external services, a common application programming interface (API) commonly defined for a plurality of the external services, and a unique API uniquely defined for each of the external services, and wherein the program for executing the process relating to the external service executes the process relating to the external service by using the common API or the unique API; and wherein the processor is further configured to: generate both the at least one first program and the one or more second programs when executing each process of the sequence of processes.

2. The information processing system according to claim 1, wherein the processor is further configured to execute a format conversion process for converting a data format of the electronic data into a predetermined data format, each of the first programs, which corresponds to one of the one or more second programs defined in the sequence-related information, makes the process execution request to the corresponding one of the one or more second programs to execute the predetermined process, and the processor is further configured to execute the sequence of processes using the electronic data, as the one or more second programs execute the predetermined process after the processor has converted the data format of the electronic data into a data format that can be processed by the one or more second programs.

3. The information processing system according to claim 1, wherein the common API is an API for using a function commonly provided by all of the plurality of the external services, and the unique API is an API for using a function provided by a predetermined external service among the plurality of the external services.

4. The information processing system according to claim 1, wherein the program for executing the process relating to the external service specifies external service identification information, which uniquely identifies the external service, in a variable part in the common API or the unique API, to execute the process relating to the external service in cooperation with at least one of the external services corresponding to the specified external service identification information.

5. The information processing system according to claim 1, wherein the application includes at least an application for uploading the electronic data sent from the device, to the external service.

6. An information processing apparatus for executing a sequence of processes using electronic data, the information processing apparatus comprising:

a program storage configured to store, for each predetermined function, a program group including at least one first program for providing the predetermined function and one or more second programs for executing a predetermined process for implementing the predetermined function in response to a process execution request from the at least one first program;

an application information storage configured to store, for each application for executing the sequence of processes, identification information for identifying the application and sequence-related information relating to the sequence of processes in association with each other, the sequence-related information defining the one or more second programs for executing each of the predetermined processes included in the sequence of processes;

a processor that is configured to accept a request from a device among one or more devices coupled to the information processing apparatus, the request including the identification information and electronic data-related information relating to the electronic data to be used for executing the sequence of processes; and execute the sequence of processes using the electronic data based on the electronic data-related information included in the request, the sequence of processes being executed as each of the first programs, which corresponds to one of the one or more second programs defined in the sequence-related information stored in the application information storage in association with the identification information included in the request, makes the process execution request to the corresponding one of the one or more second programs to execute the predetermined process, said at least one first program functioning as a component that is configured to generate an operation and request the operation to execute a process of the operation, and execute one or more processes that are common to the one or more second programs, and said one or more second programs functioning as operations that are generated by the component for executing processes that are unique to each of the one or more second programs, wherein the one or more second programs that are defined as one process flow in the sequence-related information include a program for executing a process relating to an external service, wherein the program for executing the process relating to the external service includes at least a program for executing a process of uploading the electronic data to the external service and a program for executing a process of downloading the electronic data from the external service, wherein the information processing apparatus further comprises an external service cooperating unit including, for each of the external services, a common application programming interface (API) commonly defined for a plurality of the external services, and a unique API uniquely defined for each of the external services, and wherein the program for executing the process relating to the external service executes the process relating to the external service by using the common API or the unique API; and wherein the processor is further configured to: generate both the at least one first program and the one or more second programs when executing each process of the sequence of processes.

7. An information processing method performed in an information processing system for executing a sequence of processes using electronic data, the information processing method comprising:

accepting a request from a device among one or more devices coupled to the information processing system including one or more information processing apparatuses for implementing various functions of the information processing system, storing, by a program storage configured to store, for each predetermined function, a program group including at least one first program for providing the predetermined function and one or more second programs for executing a predetermined process for implementing the predetermined function in response to a process execution request from the at least one first program, storing, by an application information storage, for each application for executing the sequence of processes, identification information for identifying the application and sequence-related information relating to the sequence of processes in association with each other, the sequence-related information defining the one or more second programs for executing each of the predetermined processes included in the sequence of processes, the request including the identification information and electronic data-related information relating to the electronic data to be used for executing the sequence of processes; and executing the sequence of processes using the electronic data based on the electronic data-related information included in the accepted request, the sequence of processes being executed as each of the first programs, which corresponds to one of the one or more second programs defined in the sequence-related information stored in the application information storage in association with the identification information included in the request, makes the process execution request to the corresponding one of the one or more second programs to execute the predetermined process, said at least one first program functioning as a component that is configured to generate an operation and request the operation to execute a process of the operation, and execute one or more processes that are common to the one or more second programs, and said one or more second programs functioning as operations that are generated by the component for executing processes that are unique to each of the one or more second programs, wherein the one or more second programs that are defined as one process flow in the sequence-related information include a program for executing a process relating to an external service, wherein the program for executing the process relating to the external service includes at least a program for executing a process of uploading the electronic data to the external service and a program for executing a process of downloading the electronic data from the external service, and wherein the program for executing the process relating to the external service executes the process relating to the external service by using a common application programming interface (API) or a unique API, wherein an external service cooperating unit including, for each of the external services, the common API commonly defined for a plurality of the external services, and a unique API uniquely defined for each of the external services; and wherein the method is further configured to, by a processor, perform:

generating both the at least one first program and the one or more second programs when executing each process of the sequence of processes.

8. The information processing system according to claim 1, wherein the common application programming interface (API) is configured to be reused in a case another external service is added.

9. The information processing system according to claim 1, wherein the sequence-related information includes a component name and an operation name corresponding to each of the one or more second programs.

10. The information processing system according to claim 1, wherein the processor is further configured to:

delete the at least one first program and the one or more second programs when a predetermined time lapses without using the at least one first program and the one or more second programs.

11. The information processing system according to claim 1, wherein the processor is further configured to:

receive a request to acquire the component, said request including a process definition indicating each process of the sequence of processes, generate the component according to the process definition, and generate the operation according to the process definition by the component.

* * * * *